(12) United States Patent
Ashikaga

(10) Patent No.: US 8,570,609 B2
(45) Date of Patent: Oct. 29, 2013

(54) IMAGE PROCESSING DEVICE WITH IMAGE DILATION PROCESSING, IMAGE PROCESSING SYSTEM, IMAGE PROCESSING METHOD AND COMPUTER READABLE MEDIUM

(75) Inventor: Hideaki Ashikaga, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 738 days.

(21) Appl. No.: 12/700,147

(22) Filed: Feb. 4, 2010

(65) Prior Publication Data
US 2011/0013232 A1 Jan. 20, 2011

(30) Foreign Application Priority Data
Jul. 16, 2009 (JP) ................................. 2009-168232

(51) Int. Cl.
*H04N 1/387* (2006.01)
*H04N 1/04* (2006.01)
*G06K 9/36* (2006.01)

(52) U.S. Cl.
USPC ............................ 358/452; 358/488; 382/289

(58) Field of Classification Search
None
See application file for complete search history.

(56) References Cited

U.S. PATENT DOCUMENTS

| 4,578,765 | A | * | 3/1986 | Barker ........................... 382/218 |
| 5,140,650 | A | * | 8/1992 | Casey et al. .................... 382/283 |
| 6,549,681 | B1 | | 4/2003 | Takiguchi et al. |
| 8,295,642 | B2 | * | 10/2012 | Yoshizawa .................... 382/289 |
| 8,320,024 | B2 | * | 11/2012 | Kawai et al. .................. 358/3.26 |
| 2003/0107586 | A1 | | 6/2003 | Takiguchi et al. |
| 2006/0188175 | A1 | | 8/2006 | Takiguchi et al. |
| 2006/0226338 | A1 | * | 10/2006 | Tojima et al. .............. 250/208.1 |
| 2007/0206233 | A1 | | 9/2007 | Koyama et al. |

FOREIGN PATENT DOCUMENTS

| JP | H06-208617 A | 7/1994 |
| JP | 09-093431 A | 4/1997 |
| JP | H11-69277 A | 3/1999 |
| JP | 2000-295438 A | 10/2000 |
| JP | 2004-213230 A | 7/2004 |
| JP | 2004-287682 A | 10/2004 |
| JP | 2004-341914 A | 12/2004 |
| JP | 2007-241356 A | 9/2007 |
| JP | 2008-022253 A | 1/2008 |
| JP | 2008-269131 A | 11/2008 |

OTHER PUBLICATIONS

Japanese Office Action in corresponding JP Patent Application No. 2009-168232 dated May 21, 2013.

* cited by examiner

*Primary Examiner* — Barbara Reinier
(74) *Attorney, Agent, or Firm* — Sughrue Mion, PLLC

(57) ABSTRACT

An image processing device is provided including: an acquiring unit that acquires position data expressing a position of plural reference images provided on a reference medium; a scanning unit that scans the plural reference images; and a determination unit. The determination unit derives the sum of positional misalignment amounts of corresponding reference images, between the position of reference images expressed by image data obtained by the scanning unit, and the position of reference images expressed by position data acquired by the acquiring unit. The determination unit executes alignment of the reference images using a common correction coefficient predetermined so as to give the smallest sum of the positional misalignment amounts. Then the determination unit determines a dilation amount for image dilation on image data such that the dilation amount increases as the sum of the positional misalignment amounts increases.

7 Claims, 26 Drawing Sheets

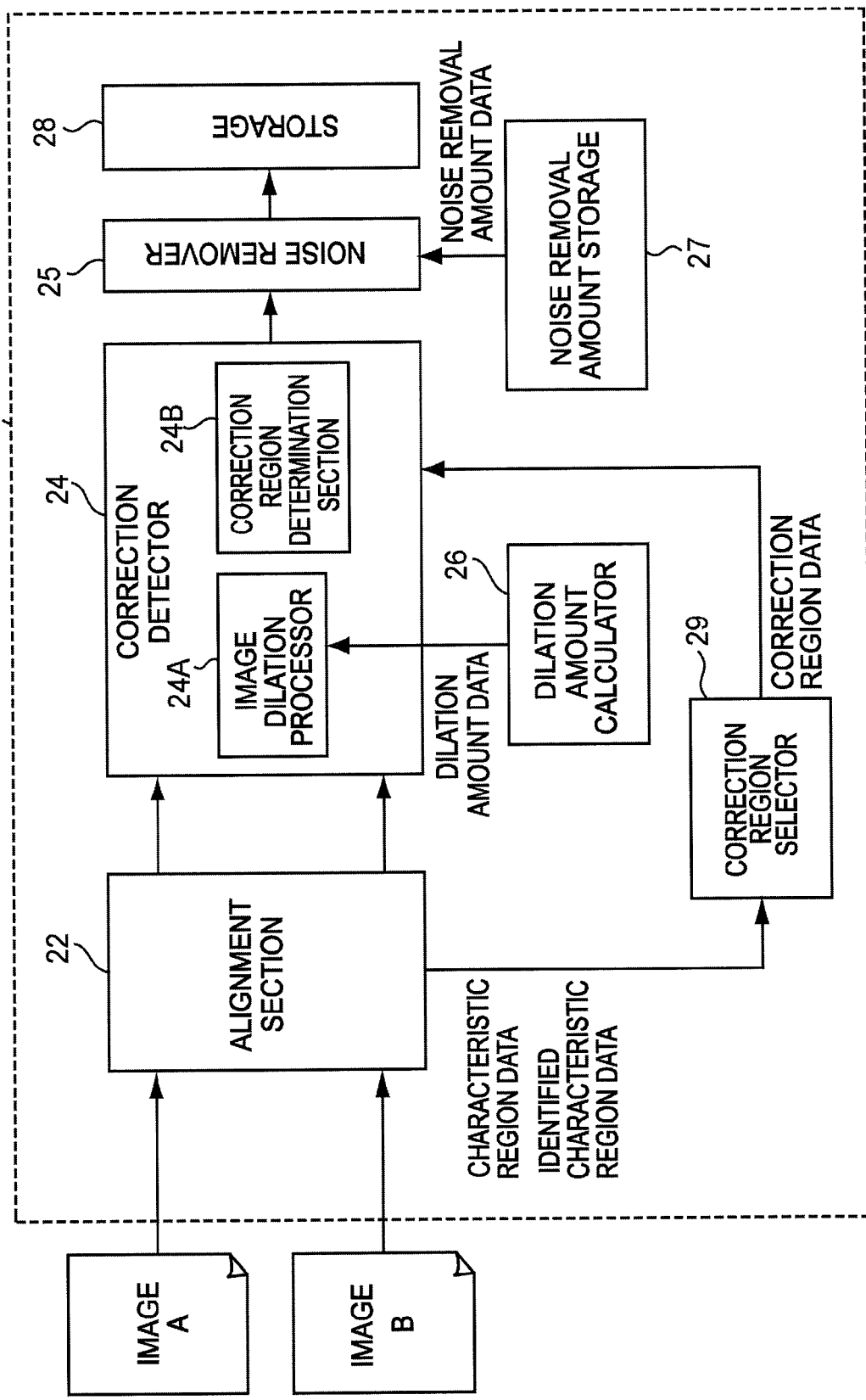

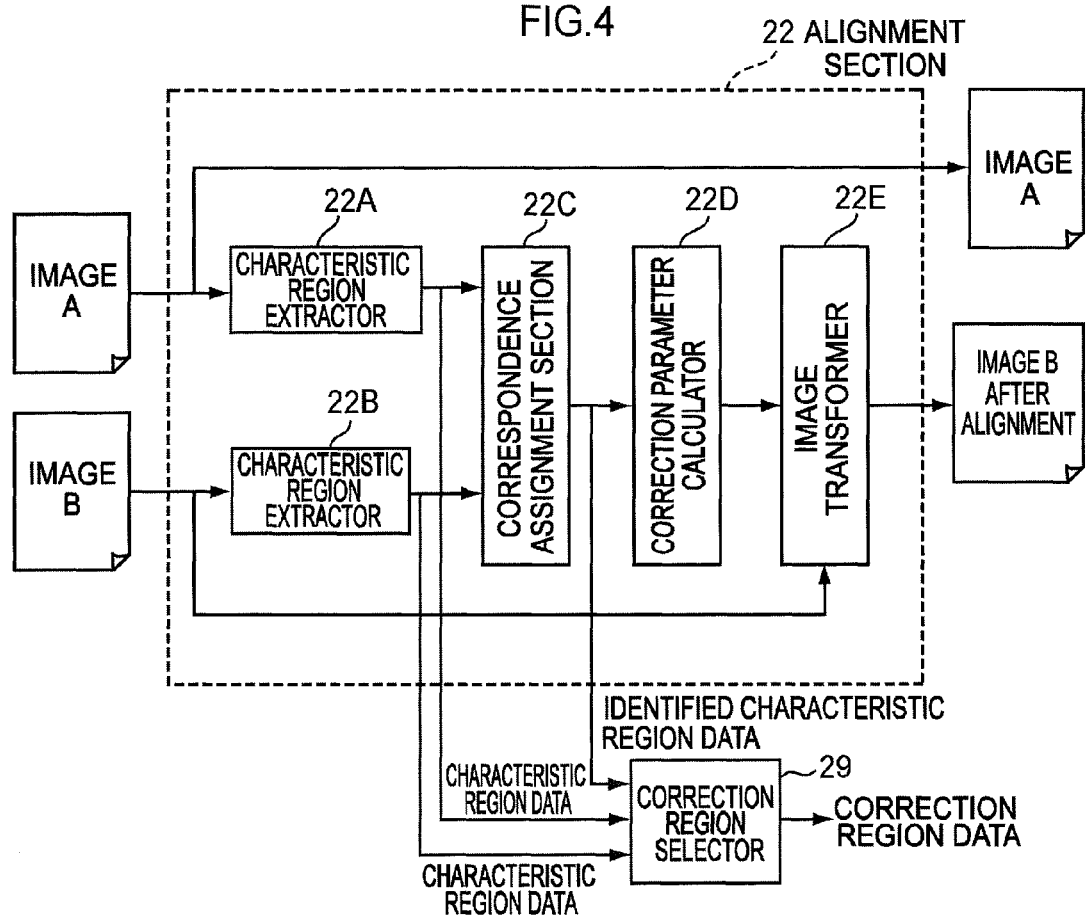
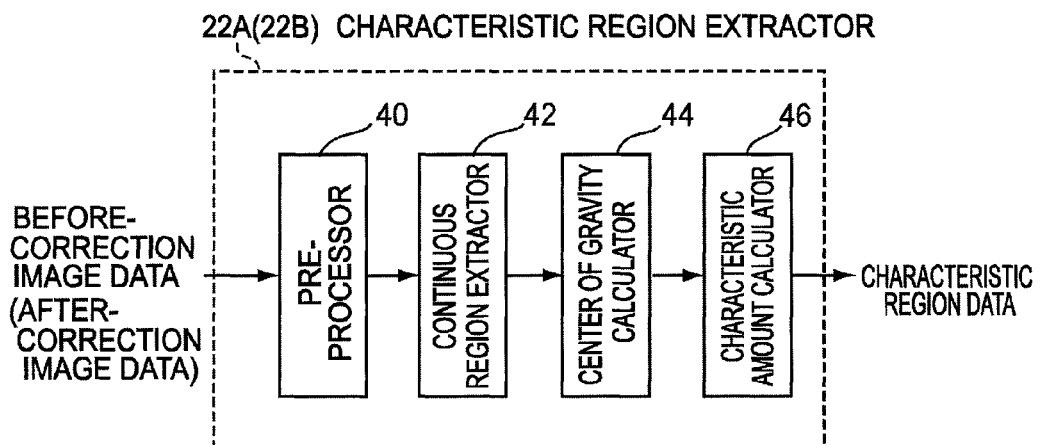

FIG.8A

CHARACTERISTIC REGION DATA 50A

| ID | POSITION OF THE CENTER OF GRAVITY | CHARACTERISTIC AMOUNT | | |
|---|---|---|---|---|
| | | SIZE | NUMBER OF PIXELS | BRUSH STROKE LENGTH |
| 1001 | (36,867) | 13,25 | 97 | 44 |
| 1002 | (54,893) | 21,28 | 212 | 51 |
| 1003 | (205,1305) | 89,24 | 748 | 124 |
| 1004 | (28,1590) | 43,24 | 320 | 74 |
| 1005 | (138,1603) | 18,76 | 421 | 100 |
| 1006 | (320,1606) | 74,105 | 2104 | 192 |
| ⋮ | ⋮ | ⋮ | ⋮ | ⋮ |
| N | (803,2359) | 62,51 | 778 | 130 |

FIG.8B

CHARACTERISTIC REGION DATA 50B

| ID | POSITION OF THE CENTER OF GRAVITY | CHARACTERISTIC AMOUNT | | |
|---|---|---|---|---|
| | | SIZE | NUMBER OF PIXELS | BRUSH STROKE LENGTH |
| 2001 | (41,865) | 14,24 | 89 | 46 |
| 2002 | (210,1302) | 87,22 | 799 | 125 |
| 2003 | (59,891) | 20,31 | 207 | 50 |
| 2004 | (33,1587) | 44,27 | 329 | 74 |
| 2005 | (203,1574) | 232,103 | 988 | 251 |
| 2006 | (325,1602) | 72,102 | 2111 | 186 |
| ⋮ | ⋮ | ⋮ | ⋮ | ⋮ |
| M | (808,2358) | 60,55 | 842 | 133 |

FIG.9

IDENTIFIED CHARACTERISTIC
REGION DATA 50C

| ID | ID |
|---|---|
| 1001 | 2001 |
| 1002 | 2002 |
| 1003 | 2003 |
| 1004 | 2004 |
| 1006 | 2006 |
| ⋮ | ⋮ |
| N | M |

FIG.12A

| CENTER POSITION | |
|---|---|
| X | Y |
| 34.14 | 56.78 |
| 84.39 | 56.78 |
| 134.6 | 56.78 |
| ⋮ | ⋮ |
| 1591.89 | 56.78 |
| 34.14 | 107.03 |
| 84.39 | 107.03 |
| 134.64 | 107.03 |
| ⋮ | ⋮ |
| 1591.89 | 107.03 |
| 34.14 | 157.28 |
| 84.39 | 157.28 |
| 134.64 | 157.28 |
| ⋮ | ⋮ |
| 34.14 | 2318.03 |
| 84.39 | 2318.03 |
| 134.64 | 2318.03 |
| ⋮ | ⋮ |
| 1591.89 | 2318.03 |

- FIRST ROW (rows 1–?)
- SECOND ROW
- THIRD ROW
- FORTY SIXTH ROW

FIG.12B

| CENTER POSITION ||
|---|---|
| X | Y |
| 35.11 | 57.65 |
| 82.51 | 56.07 |
| 136.82 | 59.73 |
| ⋮ | ⋮ |
| 1590.60 | 56.06 |
| 36.06 | 109.71 |
| 86.19 | 107.86 |
| 135.61 | 106.54 |
| ⋮ | ⋮ |
| 1590.27 | 107.76 |
| 34.88 | 157.27 |
| 87.32 | 156.60 |
| 137.55 | 108.32 |
| ⋮ | ⋮ |
| 34.02 | 2317.61 |
| 83.86 | 2315.59 |
| 130.96 | 2316.79 |
| ⋮ | ⋮ |
| 1589.03 | 2318.84 |

FIG.12C

| MISALIGNMENT AMOUNT |
|---|
| 1.31 |
| 2.01 |
| 3.67 |
| ⋮ |
| 1.48 |
| 3.29 |
| 1.98 |
| 1.09 |
| ⋮ |
| 1.78 |
| 0.74 |
| 3.00 |
| 3.19 |
| ⋮ |
| 0.43 |
| 2.50 |
| 3.88 |
| ⋮ |
| 2.97 |

BEFORE-CORRECTION IMAGE 80

あいうえお かき

くけこ さしすせ

そ たちつてと

AFTER-CORRECTION IMAGE 90

ITEMS CONTAINED IN THE CHARACTERISTIC REGION DATA
CORRESPONDING TO THE BEFORE-CORRECTION IMAGE:
あいうえおかきくけこさしすせそたちつてと

ITEMS CONTAINED IN THE CHARACTERISTIC REGION DATA
CORRESPONDING TO THE AFTER-CORRECTION IMAGE:
あいうえおかきくけこさしすせそた ⁀てと◯

FIG.17B

ITEMS CONTAINED IN THE IDENTIFIED CHARACTERISTIC
REGION DATA:    あいうえおかきくけこ    そた    てと

FIG.17C

ITEMS PRESENT IN THE CHARACTERISTIC REGION DATA OF
THE BEFORE-CORRECTION IMAGE BUT NOT PRESENT IN THE
IDENTIFIED CHARACTERISTIC REGION DATA (REGION a):
さしすせちつ

FIG.17D

ITEMS PRESENT IN THE CHARACTERISTIC REGION DATA OF
THE AFTER-CORRECTION IMAGE BUT NOT PRESENT IN THE
IDENTIFIED CHARACTERISTIC REGION DATA (REGION b):
さしすせ ⁀ ◯

FIG.17E

REGION WHERE REGION a OVERLAPS REGION b AND NUMBER OF BLACK PIXELS IN REGION a < IN REGION b → "OVERLAPPING ADDED REGION" : 「さしすせ」 と 「さ̶b̶す̶せ」

REGION WHERE REGION a OVERLAPS REGION b AND NUMBER OF BLACK PIXELS IN REGION a > IN REGION b → "PARTIALLY REMOVED REGION" : 「つ」 と 「⌒」

REGION ONLY PRESENT IN REGION a → "REMOVED REGION" : 「ち」

REGION ONLY PRESENT IN REGION b → "NON-OVERLAPPING ADDED REGION" : ◯

FIG.17F

"OVERLAPPING ADDED REGION" → DETECT BY AFTER-CORRECTION IMAGE  BEFORE-CORRECTION IMAGE

"PARTIALLY REMOVED REGION" → DETECT BY BEFORE-CORRECTION IMAGE  AFTER-CORRECTION IMAGE

"REMOVED REGION" → DETECT BY EXTRACTING FROM BEFORE-CORRECTION IMAGE

"NON-OVERLAPPING ADDED REGION" → DETECT BY EXTRACTING FROM AFTER-CORRECTION IMAGE

FIG.20

INDIVIDUAL DILATION AMOUNT DATA 50D

| ADDRESS | DILATION AMOUNT (PIXELS) |
|---|---|
| S0000001 | 3 |
| S0000002 | 5 |
| ⋮ | ⋮ |

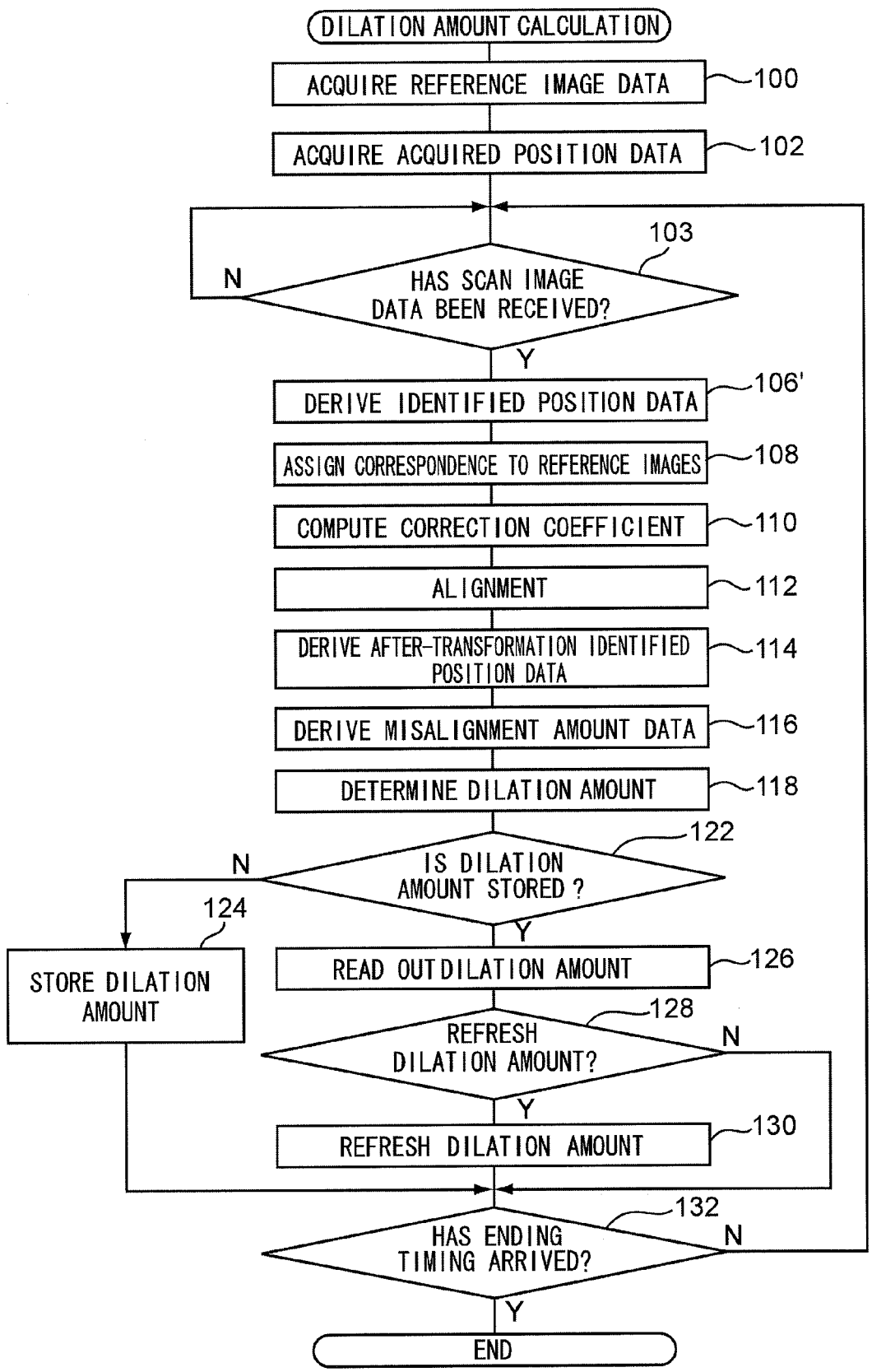

IMAGE PROCESSING DEVICE WITH IMAGE DILATION PROCESSING, IMAGE PROCESSING SYSTEM, IMAGE PROCESSING METHOD AND COMPUTER READABLE MEDIUM

CROSS-REFERENCE TO RELATED APPLICATION

This application is based on and claims priority under 35 USC 119 from Japanese Patent Application No. 2009-168232 filed on Jul. 16, 2009.

BACKGROUND

1. Technical Field

The present invention relates to an image processing device, an image processing system, an image processing method and a computer readable medium.

2. Related Art

There is a conventional technology which acquires a document image and the same document image with added annotations, and compares the document image with the document image with added annotations in order to extract the annotated locations.

SUMMARY

An image processing device according to an aspect of the present invention is an image processing device including: an acquiring unit that acquires position data expressing a position of plural reference images provided on a reference medium; a scanning unit that scans an image of a region of the reference medium where the reference image is provided; and a determination unit. The determination unit: derives the sum of positional misalignment amounts between a first instance of the plural reference images expressed by image data scanned by the scanning unit, an a second instance of the plural reference images expressed by position data acquired by the acquiring unit; performs alignment of the corresponding reference images using a common correction coefficient predetermined so as to give the smallest sum of the positional misalignment amounts; and determines an dilation amount for image dilation on image data scanned by the scanning unit, such that the dilation amount increases as the sum of the positional misalignment amounts increases.

BRIEF DESCRIPTION OF THE DRAWINGS

Exemplary embodiments of the present invention will be described in detail based on the following figures, wherein:

FIG. 3 is a functional block diagram showing a functional configuration of an image processing device according to an exemplary embodiment;

FIG. 4 is a block diagram showing a configuration of an alignment section in a functional configuration of an image processing device according to an exemplary embodiment;

FIG. 5 is a block diagram showing a configuration of a characteristic region extractor in a functional configuration of an image processing device according to an exemplary embodiment;

FIG. 8A is a schematic diagram showing a data structure of characteristic region data according to an exemplary embodiment;

FIG. 8B is a schematic diagram showing a data structure of characteristic region data according to an exemplary embodiment;

FIG. 9 is a schematic diagram showing a data structure of identified characteristic region data according to an exemplary embodiment;

FIG. 12A is a schematic diagram showing an example of acquired position data according to an exemplary embodiment;

FIG. 12B is a schematic diagram showing an example of identified position data according to an exemplary embodiment;

FIG. 12C is a schematic diagram showing an example of data expressing misalignment amount according to an exemplary embodiment;

FIG. 17A is another diagram to accompany explanation of the processing contents of an image processing program and a correction image detection routine/program;

FIG. 17B is another diagram to accompany explanation of the processing contents of an image processing program and a correction image detection routine/program;

FIG. 17C is another diagram to accompany explanation of the processing contents of an image processing program and a correction image detection routine/program;

FIG. 17D is another diagram to accompany explanation of the processing contents of an image processing program and a correction image detection routine/program;

FIG. 17E is another diagram to accompany explanation of the processing contents of an image processing program and a correction image detection routine/program;

FIG. 17F is another diagram to accompany explanation of the processing contents of an image processing program and a correction image detection routine/program;

FIG. 20 is a schematic diagram showing a data structure of individual dilation amount data items;

FIG. 21 is a flow chart showing a process flow of a dilation amount calculation program according to a second exemplary embodiment;

DETAILED DESCRIPTION

Detailed explanation will now be given of exemplary embodiments of the present invention, with reference to the drawings.

First Exemplary Embodiment

Figure 1:
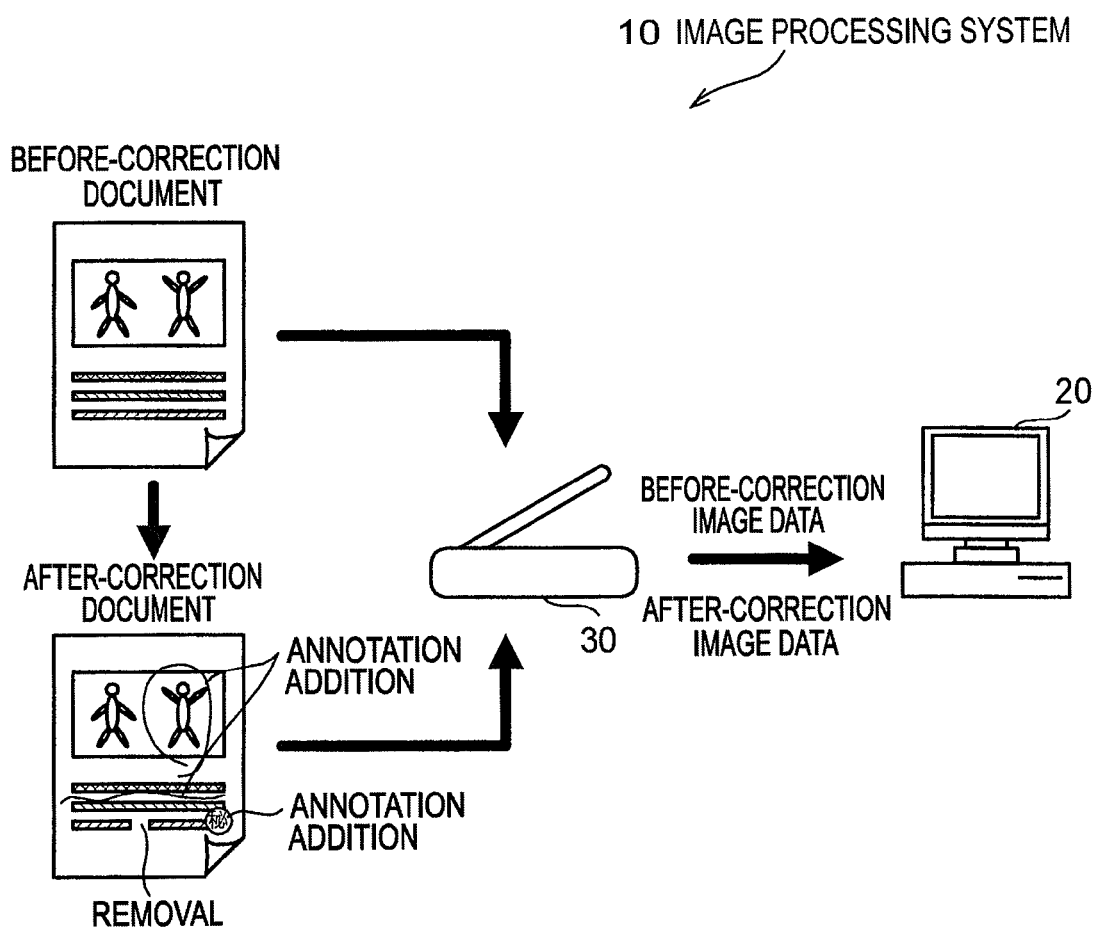
FIG. 1 is a block diagram showing a configuration of an image processing system according to a first exemplary embodiment.

FIG. 1 shows an example configuration of an image processing system 10 according to the present exemplary embodiment. As shown in FIG. 1, the image processing system 10 according to the present exemplary embodiment is equipped with an image processing device 20, such as a personal computer or the like, and an image scanning device 30, such as a scanner or the like. The image processing device 20 and the image scanning device 30 are electrically connected together, and the image processing device 20 acquires image data from the image scanning device 30, obtained by scanning with the image scanning device 30.

The image processing system 10 according to the present exemplary embodiment uses the image scanning device 30 to scan a document prior to performing correction by adding a handwritten annotation, a stamp impression or the like thereto, or performing correction by removal with an eraser, correction fluid or the like (referred to below as "before-correction document"), and to scan the document after such correction (referred to below as "after-correction document"). The image processing system 10 then uses the image processing device 20 to identify locations where correction has been performed, based on the two sets of image data obtained by scanning, and performs processing to detect (extract) from the identified locations image portions that have been corrected. Note that the image data obtained by scanning the before-correction document is referred to below as "before-correction image data", and the image data obtained by scanning the after-correction document is referred to below as "after-correction image data".

The image scanning device 30 according to the present exemplary embodiment acquires the image data obtained by scanning as image data in which each pixel value (pixel data) is configured from plural bits (8 bits in the present exemplary embodiment). Furthermore, in the image processing system 10 according to the present exemplary embodiment, a color scanner is applied as the image scanning device 30, the color scanner scanning by splitting the image of the document subjected to scanning into the three primary colors R (red), G (green) and B (blue). Note that there is no limitation to a multi-bit color scanner, a multi-bit monochrome scanner (a so-called gray scale monochrome scanner), a single-bit (two value) color scanner, a single-bit monochrome scanner, or the like, may also be used as the image scanning device 30.

Next, with reference to FIG. 2, a component configuration of an electrical system of the image processing device 20, having a particularly important role in the image processing system 10, will be explained.

Figure 2:
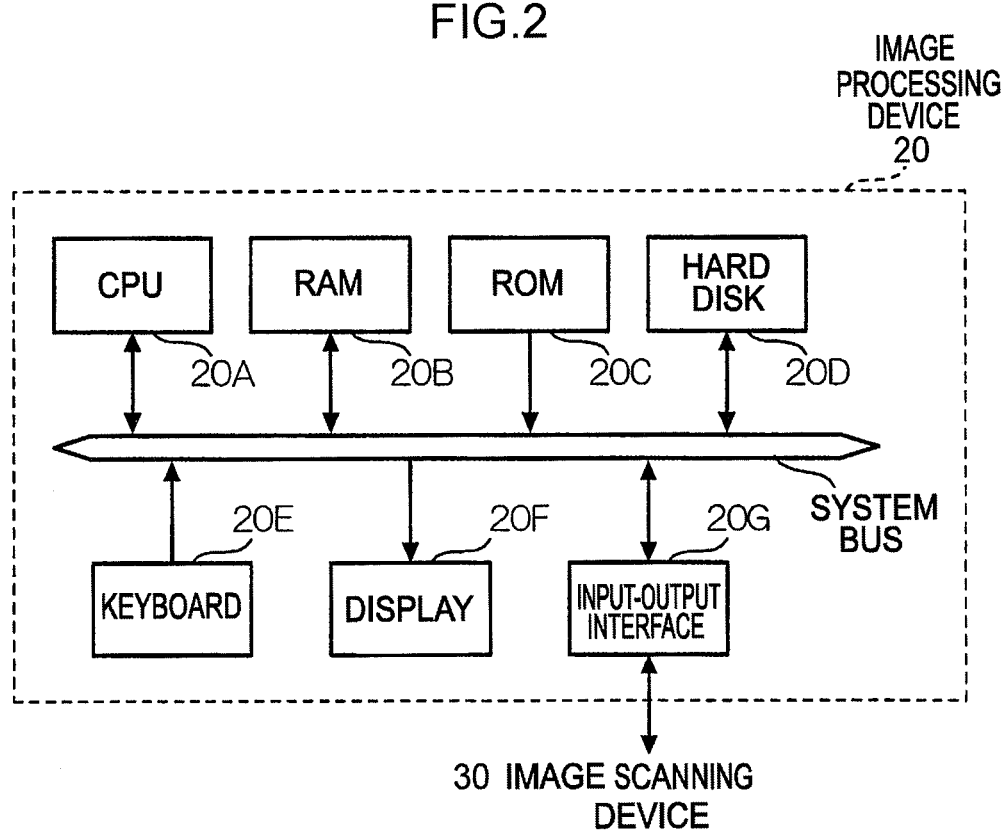
FIG. 2 is a block diagram showing a component configuration of an electrical system of an image processing device according to the first exemplary embodiment.

As shown in FIG. 2, the image processing device 20 according to the present exemplary embodiment is equipped with: a Central Processing Unit (CPU) 20A; a Random Access Memory (RAM) 20B; a Read Only Memory (ROM) 20C; a hard disk 20D; a keyboard 20E, a display 20F; and an input-output interface (I/F) 20G. The CPU 20A controls the operation of the image processing device 20 overall. The RAM 20B is employed as a work area and the like when various processing programs are executed by the CPU 20A. Various control programs and various parameters, and the like are stored in advance in the ROM 20C. The hard disk 20D is employed as a storage unit for storing various data. The keyboard 20E is employed for inputting various data. The display 20F is employed for displaying various data. The input-output interface 20G is employed for controlling external exchange of various data. These respective sections are mutually electrically connected to each other by a system BUS. The image scanning device 30 described above is connected to the input-output interface 20G.

Consequently, the CPU 20A accesses the RAM 20B, the ROM 20C, and the hard disk 20D, acquires various input data through the keyboard 20E, displays various data on the display 20F, and exchanges various data with the image scanning device 30 via the input-output interface 20G.

FIG. 3 is a functional block diagram showing a functional configuration of the image processing device 20 according to the present exemplary embodiment.

As shown in FIG. 3, the image processing device 20 according to the present exemplary embodiment is equipped with: a alignment section 22; a correction detector 24 having an image dilation section 24A and a correction region determination section 24B; a noise remover 25; a dilation amount calculator 26; a noise removal amount storage 27; a storage 28; and a correction region selector 29.

Note that the above alignment section 22 executes alignment that corrects at least one of the before-correction image data and/or the after-correction image data. This correction is made for any misalignment in the position of corresponding pixels in the before-correction image expressed by the before-correction image data and the after-correction image expressed by the after-correction image data. Such misalignment is generated to the image as a whole by differences in orientation angle of the before-correction document and the after-correction document when scanned by the image scanning device 30, and is caused by differences in the scanned environment, or the like. Note that in the alignment section 22 according to the present exemplary embodiment, characteristic regions are extracted based on the before-correction image data and the after-correction image data. These characteristic regions are regions in the before-correction image and the after-correction image that have predetermined characteristics (in the present exemplary embodiment these are a connected image of black pixels or a connected image of white pixels in binarized image data). At least one of the before-correction image data and/or the after-correction image data is transformed so that corresponding characteristic regions in the before-correction image and the after-correction image are superimposed on each other.

When this is performed in the alignment section 22 according to the present exemplary embodiment, affine transformation is performed as the transformation on one or other of the before-correction image data or the after-correction image data. However, there is no limitation thereto, and embodiments may be configured in which other known transformation methods are applied to one or other of the before-correction image data or the after-correction image data, such as bilinear transformation, Helmert transformation, secondary conformal transformation, projective transformation, dilation-reduction, rotation, translation, or the like.

The above correction detector 24 uses the image dilation section 24A to execute image dilation at an dilation amount derived by the dilation amount calculator 26, described below, on one or other of the before-correction image data or the after-correction image data (the before-correction image data in the present exemplary embodiment). The above correction detector 24 also uses the correction region determination section 24B to determine the correction state of the document, based on the correction regions selected by the correction region selector 29, described later, from the characteristic regions extracted by the alignment section 22, and to detect the correction image according to the determination result. Note that in the image dilation section 24A according to the present exemplary embodiment, as the above image dilation, processing is applied that widens an image out from the edge position of the image subject to processing, this widening being by a certain number of pixels according to the above predetermined dilation amount. However, there is no limitation thereto.

The above noise remover 25 executes noise removal on the correction image detected by the correction detector 24, at a noise removal amount expressed by noise removal amount data stored in advance by the noise removal amount storage 27. Note that the noise remover 25 according to the present exemplary embodiment applies, as the above noise removal, processing to remove an image when both the number of horizontal pixels and the number of vertical pixels of the image for processing are a certain number of pixels according to the above noise removal amount, or fewer. However, there is no limitation thereto.

The above dilation amount calculator 26 employs a calibration sheet 23, described later (see also FIG. 11), and derives the above dilation amount so as to be greater the greater the sum of local misalignment amounts between the respective images after executing the above alignment.

The correction region selector 29 then, from the characteristic regions extracted by the alignment section 22, selects correction regions where correction has been performed on the characteristic region, and outputs correction region data expressing the selected correction regions to the correction detector 24.

Next, explanation will be given regarding a configuration of the alignment section 22 according to the present exemplary embodiment, with reference to FIG. 4.

As shown in FIG. 4, the alignment section 22 according to the present exemplary embodiment is equipped with a pair of characteristic region extractors 22A, 22B, a correspondence assignment section 22C, a correction parameter calculator 22D, and an image transformer 22E.

Note that the characteristic region extractor 22A is input with the before-correction image data, and the characteristic region extractor 22B is input with the after-correction image data, respectively. The characteristic region extractors 22A, 22B extract, based on the input image data, any characteristic regions having the above predetermined characteristics (in the present exemplary embodiment these are a connected image of black pixels of a connected image of white pixels in binarized image data) in the before-correction image and the after-correction image, respectively. Then the characteristic region extractors 22A, 22B derive predetermined characteristic amounts (in the present exemplary embodiment, the size, number of pixels, and brush stroke length, as described later (see also FIG. 8A, FIG. 8B)) based on the input image data, and output the characteristic amounts as characteristic amount data.

The correspondence assignment section 22C identifies, in the before-correction image and the after-correction image, pairs of characteristic regions having a degree of similarity of characteristic amounts, expressed by the characteristic region data output from the characteristic region extractors 22A, 22B, of a predetermined measure or greater. The correspondence assignment section 22C then generates and outputs identified characteristic region data in which the pairs of identified characteristic regions are associated with each other.

The correction parameter calculator 22D computes a correction coefficient for removing misalignment of the before-correction image and the after-correction image overall, based on the misalignment amount in corresponding characteristic regions expressed by the identified characteristic region data output from the correspondence assignment section 22C. Then, the image transformer 22E employs the correction coefficient computed by the correction parameter calculator 22D and executes image transformation (in this case affine transformation), for performing alignment of the before-correction image data and the after-correction image data overall, on one or other of the before-correction image data or the after-correction image data (in this case on the after-correction image data).

Note that the correction coefficient employed in the affine transformation is a width direction displacement amount, a vertical direction displacement amount, a rotation angle, and a multiplier. The correction coefficient is computed as a value such that difference of the positions of the center of gravity of corresponding characteristic regions in the before-correction image and the after-correction image is the smallest when transformation is executed with the correction coefficient on one of the images (in this case the after-correction image). Specifically, for example, a least square method is applied, and the values for each of the width direction displacement amount, the vertical direction displacement amount, the rotation angle, and the multiplier that give the smallest sum of differences in the position of the centers of gravity of the corresponding characteristic regions in the before-correction image and the after-correction image, are derived as the correction coefficients. Note that an example of a computation method of a correction coefficient to which a least squares method is applied is described in JP-A No. 9-93431, which is incorporated by reference herein.

In the correction region selector 29 according to the present exemplary embodiment, a characteristic region not contained in the characteristic regions expressed by the identified characteristic region data is selected as a correction performed correction region from the characteristic regions extracted by the characteristic region extractors 22A, 22B. This selection is made based on the corresponding characteristic region data of the before-correction image output from the characteristic region extractor 22A, the corresponding characteristic region data of the after-correction image output from the characteristic region extractor 22B, and the identified characteristic region data output from the correspondence assignment section 22C. Correction region data expressing the selected correction region is generated by the correction region selector 29 and output to the correction detector 24.

Note that in the correction region selector 29 according to the present exemplary embodiment, the above selection of correction region is performed such that a characteristic region not contained in the characteristic region expressed by the identified characteristic region data is selected from the correction regions in the before-correction image extracted by the characteristic region extractor 22A as a correction region a, and a characteristic region not contained in the characteristic region expressed by the identified characteristic region data is selected from the correction regions in the before-correction image extracted by the characteristic region extractor 22B as a correction region b.

Explanation will next be given of a configuration of the characteristic region extractors 22A, 22B according to the present exemplary embodiment, with reference to FIG. 5. Note that since the characteristic region extractor 22A and the characteristic region extractor 22B have the same configuration and differ only in the image data input thereto, explanation will be given here of the configuration of the characteristic region extractor 22A.

As shown in FIG. 5, the characteristic region extractor 22A according to the present exemplary embodiment is equipped with a pre-processor 40, a continuous region extractor 42, a center of gravity calculator 44, and a characteristic amount calculator 46.

Note that the pre-processor 40 executes mono-chroming and binarization on input before-correction image data. The mono-chroming here is processing to make the before-correction image data into brightness only pixel data. The binarization is processing that converts the monochrome image obtained by the mono-chroming into 1 (black) or 0 (white) using a predetermined threshold value level. Note that mono-chroming may be omitted when the input image is a monochrome image.

The continuous region extractor 42 executes continuous region extraction on the before-correction image data binarized by the pre-processor 40, extracting a continuous region as the characteristic region. Note that continuous region extraction is, as an example, executed by application of the technique described in JP-A No. 12-295438, which is incorporated by reference herein. The continuous region (characteristic region) here is extracted as a continuous region of black pixels (a black run), or a continuous region of non-black pixels, white pixels (a white run) in the binarized image. The above continuous region extraction may set in advance as extraction conditions a range (smallest, largest) of predetermined size (area or number of pixels), and is executed based on predetermined setting conditions, such as regions continuous with the same type of pixels in this range, or the like.

Explanation will now be given of specific examples of continuous region for extraction by the above continuous region extraction, with reference to FIG. 6.

Figure 6:
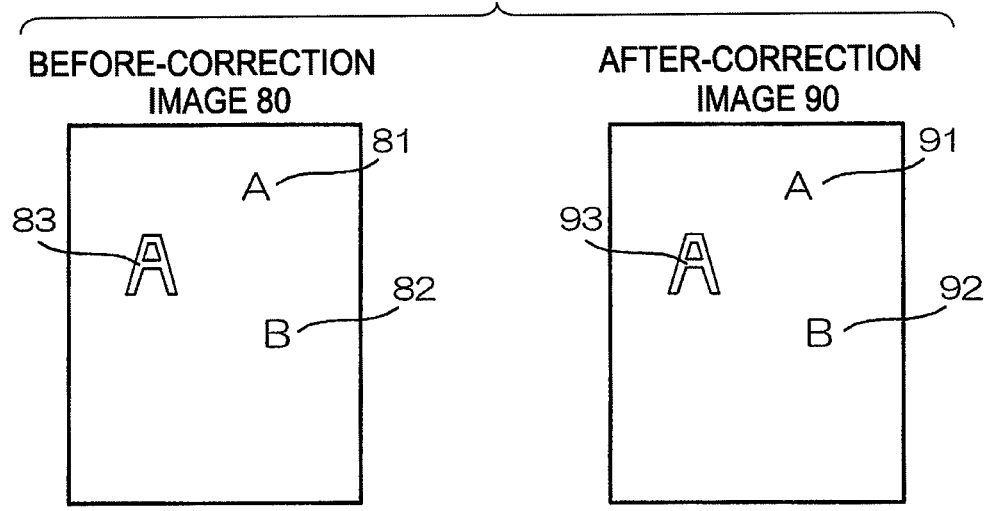
FIG. 6 is a diagram to accompany explanation of the continuous regions (characteristic regions) according to an exemplary embodiment.

FIG. 6 shows a binarized before-correction image 80 and a binarized after-correction image 90. From these images, image data having a continuous region of black pixels (black run) or image data having a continuous region of white pixels (white run) are extracted as continuous regions according to predetermined conditions. In the example shown in FIG. 6, the "A" and the "B" black letter images and the "A" whitened-out letter image are extracted from the before-correction image 80 as continuous regions 81, 82, 83, respectively, and the "A" and the "B" black letter images and the "A" whitened out letter image are extracted from the after-correction image 90 as continuous regions 91, 92, 93, respectively. Note that while the number of data items of continuous regions extracted in actual processing depends on design parameters, extraction is performed of several hundred to several thousand data items.

Furthermore, the center of gravity calculator 44 computes the center of gravity of the continuous region (characteristic region) extracted by the continuous region extractor 42, and the above characteristic amount calculator 46 computes the characteristic amount (in this case the size, the number of pixels, and the brush stroke length) of each of the continuous regions. Note that in the present exemplary embodiment, the center of gravity calculator 44 and the characteristic amount calculator 46 are separated from each other. However, obviously configuration may be made in which the center of gravity is computed in the characteristic amount calculator 46, as one of the characteristic amounts of the continuous region.

Figure 7:
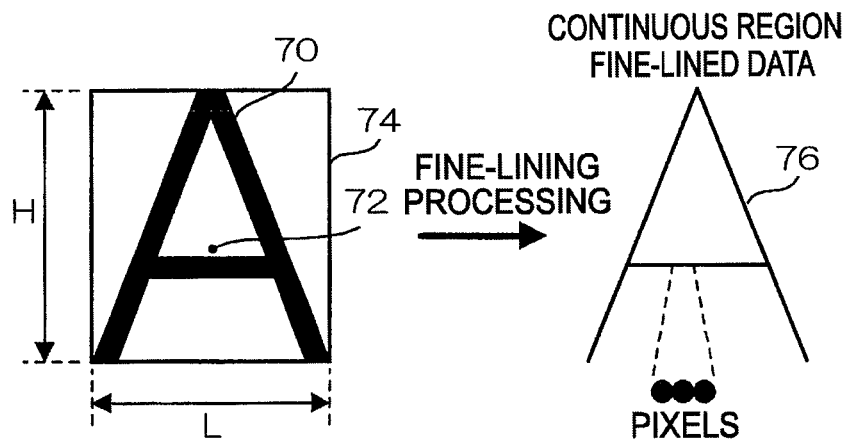
FIG. 7 is a diagram to accompany explanation of respective data of a center of gravity and characteristic amounts derived from the continuous regions according to an exemplary embodiment.

Next explanation will be given regarding the center of gravity and the characteristic amounts derived from the continuous regions, with reference to FIG. 7, FIG. 8A and FIG. 8B. The letter "A" shown in FIG. 7 is, for example, one of continuous regions 70 extracted from the before-correction image 80. FIG. 8A and FIG. 8B show, respectively, tables of data for the center of gravity and the characteristic amount, relating to continuous regions extracted from the before-correction image 80 and the after-correction image 90.

Explanation will first be given regarding details of the center of gravity and the characteristic amounts of the continuous region 70, with reference to FIG. 7.

A center of gravity 72 is data expressing the position of the center of gravity of the letter A as a continuous region 70 and is, for example, extracted as coordinate data (x, y) with the before-correction image 80 as the XY coordinate plane (see also FIG. 8A and FIG. 8B).

The size is determined as "L, H" from a width L and a height H of a circumscribing rectangle 74 surrounding so as to touch the outside of the continuous region 70 shown in FIG. 7. The number of pixels is calculated as the total number of pixels configuring the continuous region 70 itself. Furthermore, the brush stroke length, as shown in FIG. 7, is computed as the number of pixels configuring a continuous region fine line data 76, this being the continuous region 70 converted so that its lines are thinned to give a line width of one pixel.

The center of gravity calculator 44 and the characteristic amount calculator 46 compute the position of the center of gravity and the characteristic amount data, including the above size, the number of pixels, the brush stroke length, and the like, for each of the continuous regions (characteristic regions) extracted by the continuous region extractor 42 from the comparison subjects of the before-correction image 80 and the after-correction image 90. These computed amounts are organized, as an example, into characteristic region data 50A corresponding to the before-correction image 80 as shown in FIG. 8A, and characteristic region data 50B corresponding to the after-correction image 90 as shown in FIG. 8B. As shown in FIG. 8A and FIG. 8B, a single unique identification (ID) is given to each of the continuous regions extracted from the before-correction image 80 and the after-correction image 90, respectively. Then, the respective data for the position of the center of gravity and the characteristic amounts, namely the size, the number of pixels, and the brush stroke length, of each of the continuous regions are stored as characteristic region data, associated with the ID's, in a storage unit, such as the hard disk 20D or the like.

However, the correspondence assignment section 22C according to the present exemplary embodiment (see FIG. 4), as explained above, identifies pairs of characteristic regions in the before-correction image and the after-correction image having a degree of similarity of characteristic amounts, expressed by the characteristic region data output from the characteristic region extractors 22A, 22B, of a predetermined measure or greater, and generates identified characteristic region data that associates the pairs of identified characteristic regions.

The correspondence assignment section 22C is input, as an example, with the characteristic region data 50A stored by the characteristic region extractor 22A and the characteristic region data 50B stored by the characteristic region extractor 22B. The correspondence assignment section 22C then performs pattern matching based on the data stored in both the characteristic region data and generates the identified characteristic region data based on the result of pattern matching.

Note that the correspondence assignment section 22C according to the present exemplary embodiment narrows down the characteristic regions to candidate characteristic regions having a degree of similarity of a predetermined measure or greater. This is performed based on the positions of the center of gravity in each of the characteristic region data. If a characteristic region extracted from one or other image of the before-correction image or the after-correction image has a first center of gravity position, then characteristic region(s) with a center of gravity position in the other image of the two within a predetermined distance from the first center of gravity position are identified. Then the degree of similarity is computed for data of at least one of the characteristic amounts (size, number of pixels, brush stroke length) to each of the identified characteristic region data of data only for the narrowed down candidate characteristic regions. The correspondence assignment section 22C then generates as identified characteristic region data, data expressing characteristic regions only for pairs having a degree of similarity of the predetermined measure or greater. Note that in the present exemplary embodiment, the inverse of a distance between the applied characteristic amount(s) (as an example the Euclid distance) is applied as the degree of similarity. However, there is no limitation thereto, and obviously any measure that indicates the degree of similarity of the characteristic amounts, expressed in the respective characteristic region data between the before-correction image and the after-correction image, may be applied thereto.

FIG. 9 shows schematically an example of a data structure of an identified characteristic region data according to the present exemplary embodiment. As shown in FIG. 9, the identified characteristic region data generated in the correspondence assignment section 22C is data that associates the ID's of each of the characteristic regions in the before-correction image and the after-correction image having a degree of similarity of the predetermined measure or greater.

Explanation will now be given of a configuration of the dilation amount calculator 26 according to the present exemplary embodiment, with reference to FIG. 10.

Figure 10:
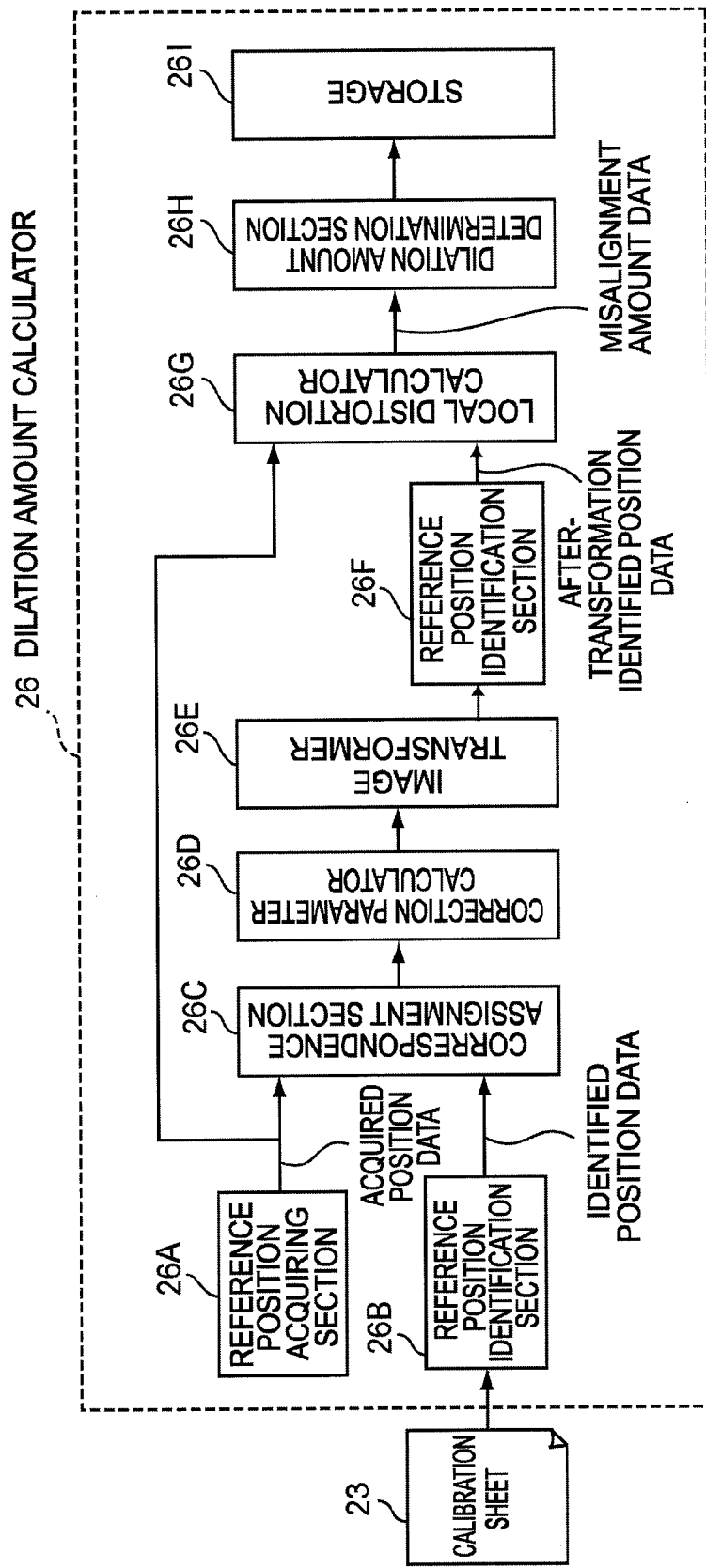
FIG. 10 is a block diagram showing a configuration of a dilation amount calculator in a functional configuration of an image processing device according to an exemplary embodiment.

As shown in FIG. 10, the dilation amount calculator 26 according to the present exemplary embodiment is equipped with a reference position acquiring section 26A, a reference position identification section 26B, a correspondence assignment section 26C, a correction parameter calculator 26D, an image transformer 26E, a reference position identification section 26F, a local distortion calculator 26G, a dilation amount determination section 26H, and a storage 26I.

In the image processing system 10 according to the present exemplary embodiment, the dilation amount to be employed is determined by the image dilation section 24A using a calibration sheet 23 as a reference medium.

Figure 11:
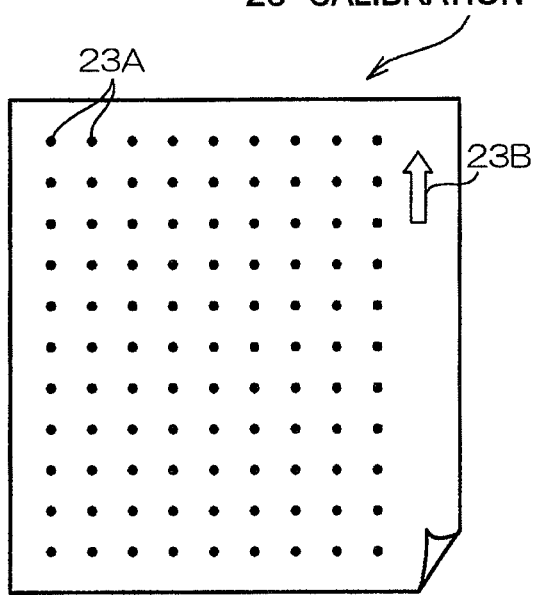
FIG. 11 is a front face diagram showing a configuration of a calibration sheet according to an exemplary embodiment.

FIG. 11 shows a calibration sheet 23 applied in the image processing system 10 according to the present exemplary embodiment. As shown in FIG. 11, the surface of the calibration sheet 23 has plural dots (points), point images 23A, drawn in a matrix pattern. An arrow 23B is also drawn on the calibration sheet 23, indicating the scan direction using the image scanning device 30. Consequently, when scanning the calibration sheet 23 with the image scanning device 30, a user sets the calibration sheet 23 such that scanning is in the direction according with the arrow 23B.

The above reference position acquiring section 26A acquires the position data expressing the position of the point images 23A on the calibration sheet 23 and outputs this as acquired position data. Note that in the image processing system 10 according to the present exemplary embodiment, the image data expressing the point images 23A drawn on the calibration sheet 23 (referred to below as the "reference image data") is stored in advance on a storage unit, such as the hard disk 20D or the like, and the acquired position data is acquired from this reference image data. Namely, the reference image data according to the present exemplary embodiment includes data expressing the position of the point images 23A drawn on the calibration sheet 23, and by scanning this data the above acquired position data is acquired.

The reference position identification section 26B identifies, based on the image data obtained by image scanning of the face of the calibration sheet 23 provided with the point images 23A using the image scanning device 30, the position of the point images 23A in the image expressed by this scanned image data (referred to below as "scanned image data"), and outputs this as identified position data.

In the image processing system 10 according to the present exemplary embodiment, the central position of each of the point images 23A is employed as the position of the point images 23A expressed by the above acquired position data and the position of the point images 23A expressed by the above identified position data. The reference position identification section 26B according to the present exemplary embodiment extracts the circumscribing rectangle of each of the point images 23A in the image expressed by the above scanned image data, and the position of each of the point images 23A is identified by deriving the central position of these circumscribing rectangles.

Note that in the image processing system 10 according to the present exemplary embodiment, coordinate data is derived for the positions expressed by the above acquired position data and for the positions expressed by the above identified position data. This derived coordinate data is in an XY coordinate plane in which the point images 23A of the calibration sheet 23 are drawn and has as its origin the position of one predetermined point of the point images 23A (in the present exemplary embodiment, the point image 23A positioned at the top left corner point when the viewing the calibration sheet 23 from the front, referred to below as the "reference point image").

The correspondence assignment section 26C, based on the acquired position data and the identified position data output respectively from the reference position acquiring section 26A and the reference position identification section 26B, generates reference image correspondence data that identifies correspondence between each of the point images 23A expressed by the above reference image data and the corresponding point images 23A expressed by the above scanned image data, and outputs the generated data. Note that in the image processing system 10 according to the present exemplary embodiment, the identification of the corresponding point images 23A is performed by identifying the point images 23A of the same placement sequence number in the horizontal direction and the vertical direction of the each of the point images 23A, relative to the position of a predetermined point image 23A in the calibration sheet 23 (the above reference point image in the present exemplary embodiment).

The above correction parameter calculator 26D, based on the misalignment amount in the positions of corresponding point images 23A expressed by the reference image correspondence data output from the correspondence assignment section 26C, computes a correction coefficient so as to remove overall misalignment of the point images 23A expressed by the reference image data and the point images 23A expressed by the scanned image data. Then the image transformer 26E employs the correction coefficient computed by the correction parameter calculator 26D to execute image processing (in this case affine transformation) similar to the processing by the image transformer 22E described above, on the scanned image data as image transformation to align the corresponding point images 23A overall.

Note that, as explained above, the correction coefficient employed in affine transformation is the width direction displacement amount, the vertical direction displacement amount, the rotation angle, and the multiplier. When transformation is executed based on the correction coefficient computed by the correction parameter calculator 26D, this correction coefficient is computed to give the smallest value of difference between the central positions of the corresponding point images 23A. Specifically, for example, the values for each of the width direction displacement amount, the vertical direction displacement amount, the rotation angle, and the multiplier are derived as the correction coefficient such that the sum of differences in the central positions of the corresponding point images 23A is as small as possible, by application of a least squares method.

The reference position identification section 26F then identifies the position of the point images 23A in the image expressed by the scanned image data in a similar manner to the above reference position identification section 26B, based on the scanned image data to which image transformation processing has been executed by the image transformer 26E, and outputs the after-transformation identified position data.

The above local distortion calculator 26G, based on the acquired position data output from the reference position acquiring section 26A and the after-transformation identified position data output from the reference position identification section 26F, derives misalignment amount data representing the misalignment amount for corresponding point images 23A, between the positions of each of the point images 23A expressed by the acquired position data to the positions of each of the corresponding point images 23A expressed by the after-transformation identified position data, as an overall value of image localized distortion that still remains in the scanned image after the image transformation processing has be executed by the image transformer 22E to perform alignment of the image obtained by scanning with the image scanning device 30.

Note that in the local distortion calculator 26G according to the present exemplary embodiment, for the above corresponding point images 23A an average value of the misalignment amount for all the point images 23A is employed as the above misalignment amount data. For example, if the position of the point images 23A expressed by the acquired position data is as shown in FIG. 12A and the position of the point images 23A expressed by the identified position data is as shown in FIG. 12B, then the misalignment amount of the corresponding point images 23A is as shown in FIG. 12C. In this case the above misalignment amount data is the average value of all of the misalignment amounts shown in FIG. 12C.

In the image processing device 20 according to the present exemplary embodiment, the Euclid distance between the central positions of corresponding point images 23A is employed at the above misalignment amount used by the correction parameter calculator 26D and the local distortion calculator 26G. However, there is no limitation thereto, and misalignment amounts represented by other parameters may be employed. In the image processing device 20 according to the present exemplary embodiment, the arithmetic average is employed as the above average value of misalignment amount. However, there is no limitation thereto and configurations may be made that employ other average values, such as root mean square values, geometrical mean, or the like.

In the above dilation amount determination section 26H, dilation amount data, representing a dilation amount that increases as the misalignment amount expressed by the misalignment amount data output from the local distortion calculator 26G increases, is determined and stored in the storage 26I.

In the image processing device 20 according to the present exemplary embodiment, as an example shown in the following Table 1, a table (referred to below as "dilation amount transformation table") showing the relationship between the misalignment amount expressed by the misalignment amount data and the dilation amount is stored in advance in a storage unit, such as the hard disk 20D, and the dilation amount corresponding to the above misalignment amount is determined with reference to this table. However, there is no limitation thereto, and obviously other methods of acquiring the dilation amount may be employed, such as storing in advance a computation formula for computing values like those of the table, then acquiring by computation using the computation formula, or the like.

TABLE 1

| Misalignment Amount | Dilation Amount |
| --- | --- |
| 3.0 pixels or greater | 5 pixels |
| 2.0 pixels up to, but not exceeding, 3.0 pixels | 4 pixels |
| 1.0 pixel up to, but not exceeding 2.0 pixels | 3 pixels |
| 0.5 pixels up to, but not exceeding 1.0 pixel | 2 pixels |
| 0.0 pixels up to, but not exceeding 0.5 pixels | 1 pixel |

The noise removal amount storage 27 stores noise removal amount data representing the noise removal amount to be employed by the noise remover 25. In the image processing system 10 according to the present exemplary embodiment, a constant value (in this case 3 pixels) from historical experimental values is stored in the noise removal amount storage 27. However, there is no limitation thereto, and an embodiment may be configured where the noise removal amount data is set by a user and stored, or may be automatically determined, based on the described misalignment amount expressed by the above misalignment amount data, and stored or the like.

Note that processing by each configuration component of the image processing device 20 configured as described above (the alignment section 22, the correction detector 24, the noise remover 25, the dilation amount calculator 26, and the correction region selector 29) is executed by a program, and may be realized by a software configuration using a computer. In such cases, such a program is contained in a program according to the present exemplary embodiment. However, there is no limitation to realization by software configuration, and realization may be by way of a hardware configuration, or a combination of a software configuration and a hardware configuration.

Explanation will now be given of a case where the image processing system 10 according to the present exemplary embodiment is realized by processing with each of the above configuration components by execution of the above program. In such cases, the program may be applied in an embodiment in which the program is installed in advance in the image processing device 20, an embodiment in which the program is provided stored on a computer readable storage medium, an embodiment where the program is distributed via a wired or wireless communications unit, or the like.

Explanation will now be given of the operation of the image processing system 10 according to the present exemplary embodiment.

Figure 13:
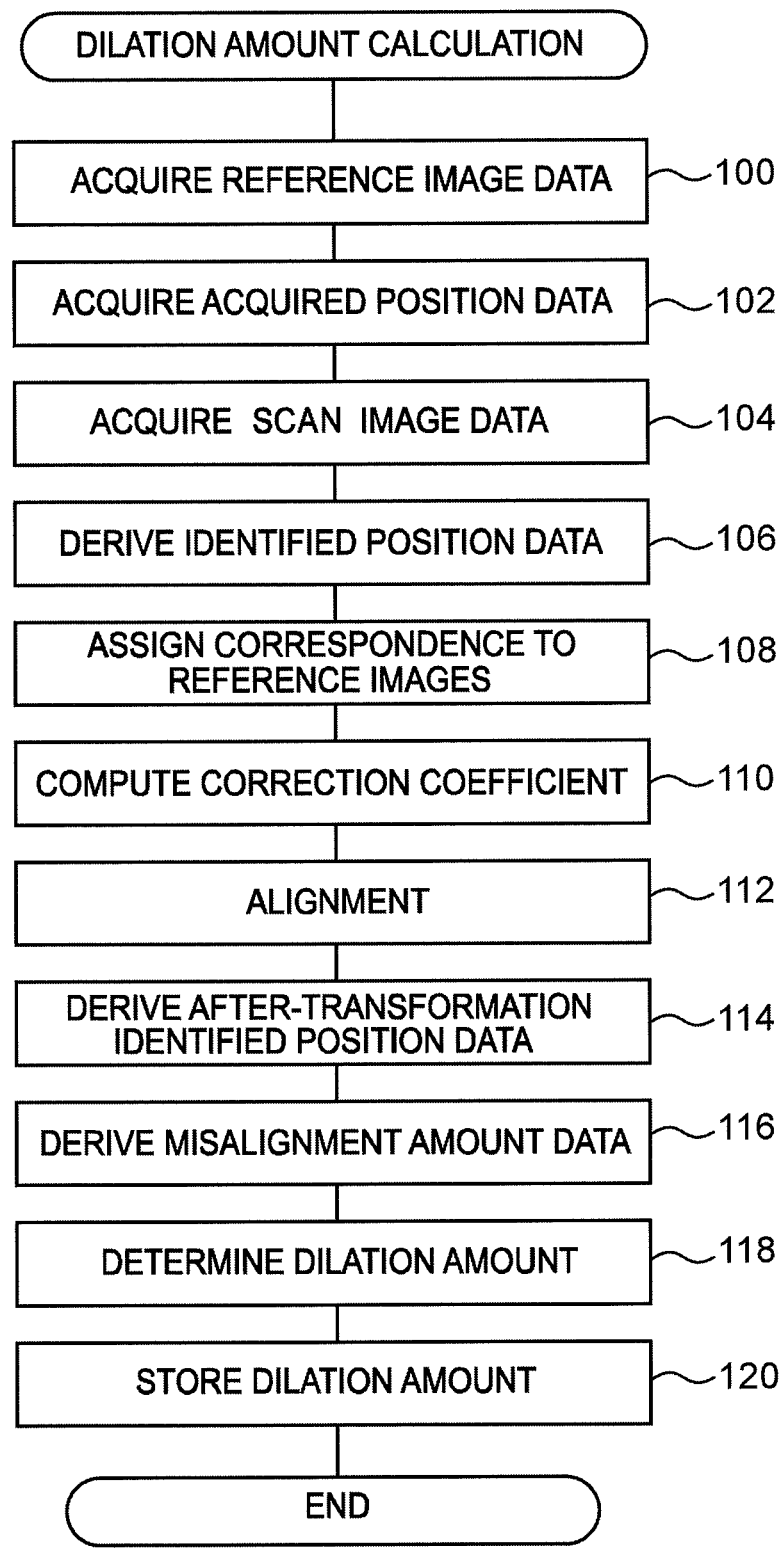
FIG. 13 is a flow chart showing a process flow of a dilation amount calculation program according to the first exemplary embodiment.

First, the operation will be explained of the image processing system 10 when deriving the dilation amount, with reference to FIG. 13. FIG. 13 is a flow chart showing the process flow of processing in an dilation amount calculation program executed on such an occasion by the CPU 20A of the image processing device 20. In order to avoid confusion, explanation will be given here of a case where the reference image data described above is input from a non-illustrated external device, the scanned image data is input from the image scanning device 30 as data expressing an image of the same size as that of the reference image data, and both the reference image data and the scanned image data are stored in advance in a predetermined region of the hard disk 20D.

At step 100 in FIG. 13, the reference image data is acquired by reading out from the hard disk 20D, and, in the next step 102, the acquired position data is acquired from the acquired reference image data by processing similar to that of the processing in the reference position acquiring section 26A described above.

At the next step 104, the scanned image data is acquired by reading out from the hard disk 20D. In the next step 106, the identified position data is derived based on the acquired scanned image data, by processing similar to the processing of the reference position identification section 26B described above.

At the next step 108, based on the acquired position data that has been acquired and the derived identified position data, correspondences are identified between point images 23A by processing similar to the processing of the correspondence assignment section 26C described above, and the reference image correspondence data is generated. At the next step 110, based on the misalignment amount of positions of corresponding point images 23A as expressed in the generated reference image correspondence data, the correction coefficient is computed by processing similar to that of the processing of the correction parameter calculator 26D described above.

At the next step 112, image transformation processing (image alignment) employing the computed correction coefficient is executed on the scanned image data by processing similar to the processing of the image transformer 26E described above. At the next step 114, based on the scanned image data to which the above image transformation processing has been executed, after-transformation identified position data is derived by processing similar to the processing by the reference position identification section 26F described above.

At the next step 116, based on the acquired position data and the after-transformation identified position data, misalignment amount data is derived by processing similar to the processing by the local distortion calculator 26G described above. At the next step 118, the dilation amount is determined by processing similar to the processing by the dilation amount determination section 26H described above. Furthermore, at the next step 120, after the dilation amount data expressing the determined dilation amount has been stored on the hard disk 20D, the current dilation amount calculation program is ended.

Figure 14:
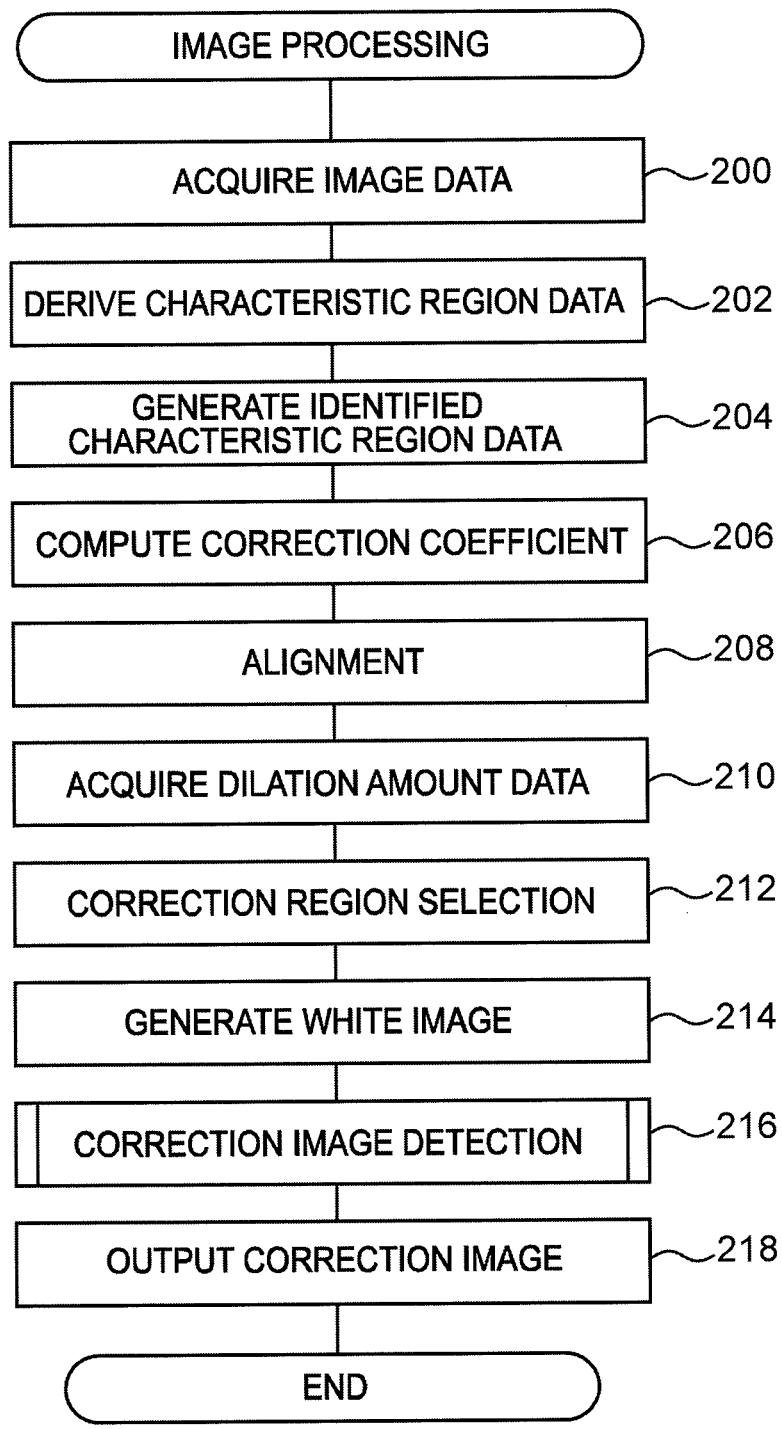
FIG. 14 is a flow chart showing a process flow of an image processing program according to an exemplary embodiment.

The operation of the image processing system 10 when executing image processing to detect correction images will now be explained, with reference to FIG. 14. FIG. 14 is a flow chart showing a process flow of an image processing program executed on such an occasion by the CPU 20A of the image processing device 20. In order to avoid confusion, explanation will be given here of a case where the proceeding subjects, the before-correction image data for processing and the after-correction image data, are input from the image scanning device 30 as data expressing original images of the same size, stored in advance in a predetermined region of the hard disk 20D. Explanation is also given here of a case where, in order to avoid confusion, the noise removal amount data described above is stored in advance in a predetermined region of the hard disk 20D.

Figure 16:
FIG. 16 is a diagram to accompany explanation of the processing contents of an image processing program and a correction image detection routine/program according to an exemplary embodiment, a front face diagram of examples of a before-correction image and an after-correction image.

In step 200 of FIG. 14, the processing subjects of the before-correction image data and the after-correction image data are acquired by reading out from the hard disk 20D. At the next step 202, the characteristic region data (see FIG. 8A and FIG. 8B), corresponding the before-correction image and the after-correction image, is derived by processing similar to the processing by the characteristic region extractors 22A, 22B described above, and stored. For example, when the before-correction image 80 and the after-correction image 90 are as shown in FIG. 16, the processing of current step 202 derives characteristic region data related to the characteristic regions shown in FIG. 17A (the continuous regions in the present exemplary embodiment) separately for each of the images of the before-correction image and the after-correction image.

At the next step 204, the identified characteristic region data is generated by processing similar to the processing by the correspondence assignment section 22C described above, based on the derived characteristic region data. By the processing of the current step 204, as an example, the identified characteristic region data of corresponded characteristic regions shown in FIG. 17B is generated (see also FIG. 9).

At the next step 206, a correction coefficient is computed to remove overall misalignment between the before-correction image and the after-correction image by processing similar to the processing by the correction parameter calculator 22D described above, based on the generated identified characteristic region data. At the next step 208, the computed correction coefficient is employed, and image transformation (affine transformation in the present exemplary embodiment) is executed in order to positionally align the before-correction image and the after-correction image overall, by processing similar to the processing by the image transformer 22E described above. Furthermore, at the next step 210, the dilation amount data is acquired by reading out from the hard disk 20D.

At the next step 212, the correction regions, the characteristic regions to which correction has been performed, are selected by processing similar to the processing by the correction region selector 29 described above from the characteristic regions extracted by the characteristic region data calculation of the above step 202, and correction region data expressing the selected characteristic regions (correction regions) is generated. Note that in the above step 208, the characteristic region data corresponding to the image data on which the image transformation has been executed (in this case the after-correction image data) is preferably replaced by a characteristic region data corresponding to the image after image transformation is applied.

In the processing of the current step 212, when performing selection of the correction regions, as correction regions from the characteristic regions of the before-correction image extracted by the characteristic region extractor 22A, which are regions not contained in the characteristic region expressed by the identified characteristic region data (correction region a), as an example, correction region data expressing the characteristic region shown in FIG. 17C is generated. Also, when performing selection of correction regions, as correction regions from the characteristic regions of the after-correction image extracted by the characteristic region extractor 22B, which are regions not contained in the characteristic region expressed by the identified characteristic region data (correction region b), as an example, correction region data expressing the characteristic region shown in FIG. 17D is generated.

At the next step 214, image data (referred to below as "white image data") expressing a white image is generated of the width of the before-correction image (in this case the number of pixels in the horizontal direction of the image) and the height of the before-correction image (in this case the number of pixels in the vertical direction of the image). At the next step 216, as processing of the correction detector 24 and the noise remover 25, a correction image detection routine/program is executed based on the before-correction image data and the after-correction image data corresponding to the correction regions expressed by the above correction region data.

Explanation will now be given regarding the correction image detection routine/program, with reference to FIG. 15.

Figure 15:
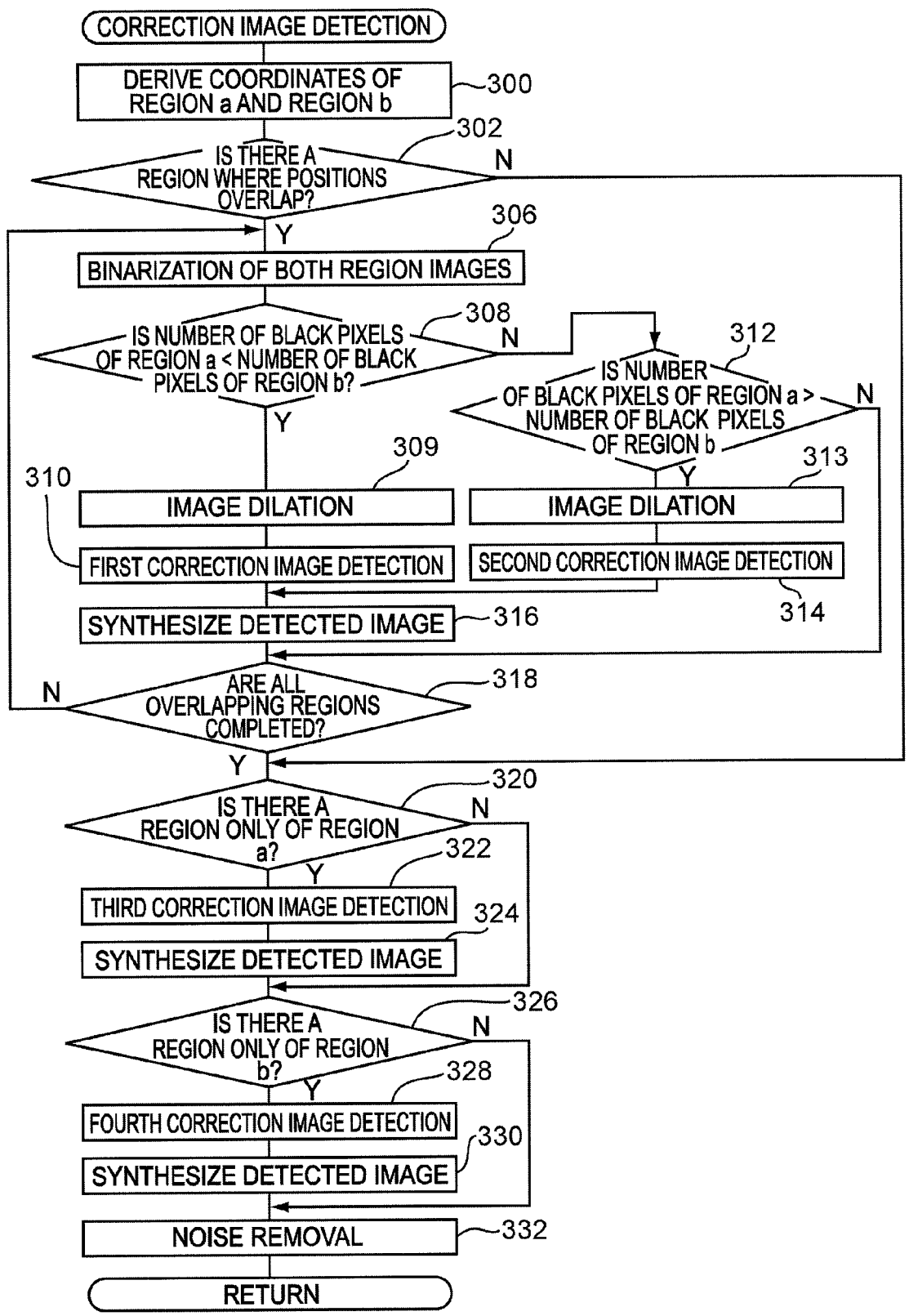
FIG. 15 is a flow chart showing process flow of a correction image detection routine/program according to an exemplary embodiment.

Step 300 of FIG. 15, as an example, derives coordinates expressing the range of all the regions of correction region a and correction region b expressed by the correction region data generated by the processing of above step 212.

First, data for each position of the center of gravity and each size corresponding to each of the correction regions is acquired from the characteristic region data.

Next, with the position of the center of gravity expressed by the acquired center of gravity position data at the center, the coordinate positions of corner apexes (in the present exemplary embodiment the top left corner apex and the bottom right corner apex) of a rectangular region having the width L and the height H expressed by the acquired size data are computed as the above correction region coordinates for each of the correction regions.

In the next step 302, based on the correction region coordinates of each of the correction regions derived by the processing of above step 300, determination is made as to whether or not there is any overlapping region present between the correction region included in the correction region a and the correction region included in the correction region b. When this determination is negative the routine proceeds to step 320, as described below, however when this determination is positive the routine proceeds to step 306.

At step 306, monochroming and binarization similar to the processing by the pre-processor 40 are executed on before-correction image data and the after-correction image data corresponding to a first pair of regions (referred to below as "region subjected to processing") from one or other of the regions, determined by the processing of above step 302, to be an overlapping region in the before-correction image data and the after-correction image data (resulting from executing the image transformation thereon by the above step 208). At the next step 308, determination is made as to whether or not the number of black pixels in the binarized before-correction image data (referred to below as the "before-correction black pixel number") is less than the number of black pixels in the binarized after-correction image data (referred to below as the "after-correction black pixel number"). When this determination is positive, the region subjected to processing is deemed an "overlapping added region", this being an added region overlapping an image already existing on the before-correction document, and the routine proceeds to step 309.

At step 309, image dilation that enlarges by the dilation amount expressed by the dilation amount data acquired by the processing of above step 210 is executed on the binarized before-correction image data, using processing similar to the processing by the image dilation section 24A described above.

At the next step 310, predetermined first correction image detection corresponding to the overlapping added region is executed, using the image data from each of the before-correction image and after-correction image that have been dilated by the processing of above step 309, and then the routine proceeds to step 316.

Note that in the correction image detection routine/program according to the present exemplary embodiment, as the above first correction image detection, processing is applied that subtracts the before-correction image data subjected to the image dilation by the processing of above step 309 from the binarized after-correction image data, for each of the corresponding pixels.

When determination is negative at above step 308, the routine proceeds to step 312, and determination is made as to whether or not the number of black pixels before-correction is greater than the number of black pixels after-correction, and when this determination is negative, the routine proceeds to step 318, described later. However, when at step 312 determination is positive, the region subjected to processing is deemed a "partially removed region", this being a region from which a portion of the image already present on the before-correction document has been removed, and the routine proceeds to step 313.

At step 313, image dilation is executed on the binarized before-correction image data by processing similar to the processing of above step 309. At the next step 314, a predetermined second correction image detection corresponding to the partially removed region is executed using the image data from each of the before-correction image that has been dilated by the processing of above step 313 and the after-correction image, and then the routine proceeds to step 316.

Note that in the correction image detection routine/program according to the present exemplary embodiment, as the above second correction image detection, processing is applied that subtracts the binarized after-correction image data from the before-correction image data subjected to the image dilation by the processing of above step 313, for each of the corresponding pixels.

Furthermore, as described above, in the correction image detection routine/program according to the present exemplary embodiment, the image dilation of the above step 309 and step 313 is executed on the binarized image data. However, there is no limitation thereto, and an embodiment may be configured where image dilation is executed on non binarized image data. In such cases, non binarized data is utilized for the after-correction image data in the above step 310 and step 314.

At step 316, the image data obtained by processing of above step 310 or step 314 is superimposed (over-written) on the white image data generated by the processing of above step 214. A detected correction image or the detected removed image is thereby synthesized. At the next step 318, determination is then made as to whether or not the processing of above step 306 to step 316 has been completed for all of the correction regions determined by the processing of the above step 302 to be overlapping regions. When this determination is negative the routine returns to step 306, and the processing of step 306 onward is re-executed. However, when this determination is positive, the routine proceeds to step 320. Note that when execution of the processing of the above step 306 to step 318 is repeated, this is done such that only the overlapping correction regions that have not yet been subjected to processing are employed as the region subject to processing.

At step 320, determination is made as to whether or not there is a region in the correction region included in the correction region a that does not overlap with any of the correction regions included in the correction region b, based on the correction region coordinates for each of the correction regions derived by the processing of above step 300. When this determination is positive, the region subjected to processing is deemed a "removal region", this being a region where the image already present in the before-correction document has been removed, and the routine proceeds to step 322. A predetermined third correction image detection corresponding to the removed region is then executed, and then the routine proceeds to step 324. Note that processing that extracts image data corresponding to the above removed region from the before-correction image data may be applied as the third correction image detection in the correction image detection routine/program according to the present exemplary embodiment.

At step 324, by superimposing (overwriting) the image data obtained by the processing of above step 322 on the above white image data, a detected correction image (removed image) is synthesized, and the routine then proceeds to step 326. Note that when determination at above step 320 is negative, the routine proceeds to step 326 without execution of the processing of above step 322 and step 324.

At step 326, determination is made as to whether or not there is a region in the correction region included in the correction region b that does not overlap with any of the correction regions included in the correction region a, based on the correction region coordinates for each of the correction regions derived by the processing of above step 300. When this determination is positive, the region subjected to processing is deemed a "non-overlapping added region", this being a region where there is no image already present in the before-correction document having added annotations, and the routine proceeds to step 328. A predetermined fourth correction image detection corresponding to the non-overlapping added region is then executed using the after-correction image data, and then the routine proceeds to step 330. Note that processing that extracts image data corresponding to the above non-overlapping added region from the after-correction image data may be applied as the fourth correction image detection in the correction image detection routine/program according to the present exemplary embodiment.

In step 330, the image data obtained by the processing of above step 328 is superimposed (overwritten) on the above white image data. By so doing, a detected correction image (added image) is synthesized, and then the routine proceeds to step 332. Note that when determination at the above step 326 is negative, the routine proceeds to step 332 without executing the processing of above step 328 and step 330.

At step 332, the noise removal amount data is acquired by reading out from the hard disk 20D, and noise removal is executed, at the noise removal amount expressed by the acquired noise removal amount data, on the white image data superimposed with the correction image using the above processing, and then the correction image detection routine/program is ended.

In FIG. 17E, conditions and example images are shown for overlapping added region, partially removed region, removed region, and non-overlapping added region. In FIG. 17F, summarized detection methods are shown for correction images by each of the correction image detection, from the above first correction image detection to the fourth correction image detection.

When the correction image detection routine/program is ended, the routine proceeds to step 218 of the image processing program (see FIG. 14), and the correction image using the white image data superimposed with the correction image by the above processing is output, and then the present image processing program is ended. Note that in the image processing program according to the present exemplary embodiment, output by display on the display 20F, output by printing using a non-illustrated printer (a so-called image processing device), or by both of these, may be applied as the processing that outputs the correction image according to above step 218. However, there is no limitation thereto, and other output modes may be employed, such as a mode that performs one of other of the above, a mode that outputs speech by a speech synthesizing device, or the like. Furthermore, in the image processing program according to the present exemplary embodiment, explanation has been given of a case in which the detected correction image, by superimposing the correction image on the white image data, is stored. However, there is no limitation thereto, and other modes may be employed, such as a mode in which coordinates expressing the position of the detected correction image are stored, a mode in which data identifying the correction image is stored, or the like. Furthermore, modes may be employed in which the color is changed, or the like, in the added image and/or the removed image, such that the added image and the removed image are output in a discriminated state.

Second Exemplary Embodiment

In the first exemplary embodiment, explanation has been given of an exemplary embodiment for a case where one image processing device and one image scanning device are connected together in a one-to-one relationship. However, in the second exemplary embodiment, explanation will given of a case where one image processing device is provided with plural image scanning devices, connected together in a one-to-many relationship.

First, explanation will be given of the configuration of an image processing system 10' according to the present exemplary embodiment, with reference to FIG. 18.

Figure 18:
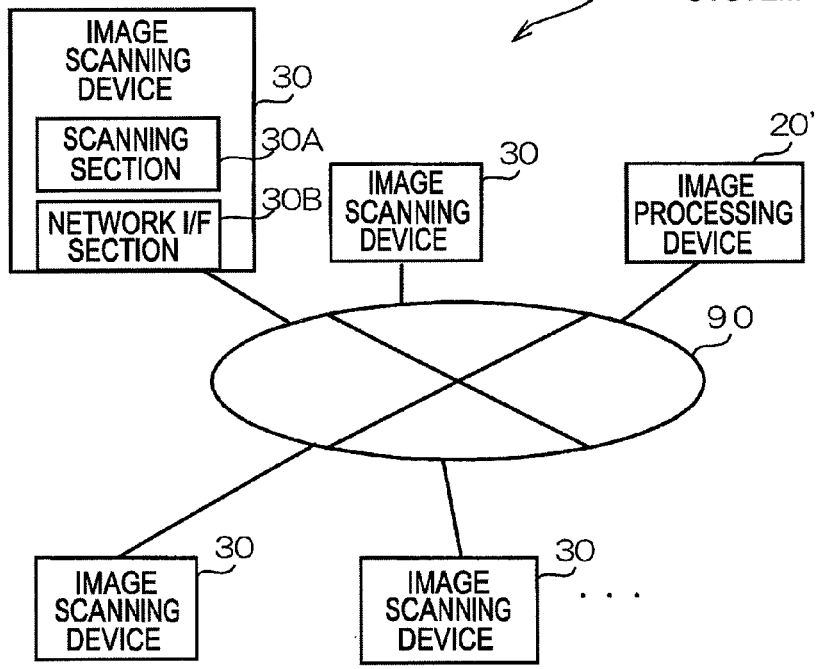
FIG. 18 is a block diagram showing a configuration of an image processing system according to a second exemplary embodiment.

As shown in FIG. 18, the image processing system 10' according to the present exemplary embodiment is equipped with an image processing device 20', such as a personal computer or the like, and plural image reading devices 30, such as scanners or the like, with each of these devices communicably connected via a network 95.

In the image processing system 10' according to the present exemplary embodiment the internet is employed as the network 95. However, there is no limitation thereto, and various networks may also be applied, such as an intranet, a Local Area Network (LAN), a Value Added Network (VAN), a telephone line network, an ECHONET, a Home PNA, or the like, either stand-alone or in combinations thereof.

Each of the image reading devices 30 according to the present exemplary embodiment is equipped with: a scanning section 30A that scans various images, such as a before-correction document, an after-correction document, a calibration sheet 23, and the like; and a network interface (I/F)

section 30B for connection to the network 95. Each of the image reading devices 30 is connected to the network 95 via the network I/F section 30B.

Next, a component configuration of an electrical system of the image processing device 20', having a particularly important role in the image processing system 10', will be explained, with reference to FIG. 19. Note that configuring elements in FIG. 19 that are similar to those of FIG. 2 are allocated the same reference numerals as in FIG. 2, and explanation thereof is abbreviated.

Figure 19:
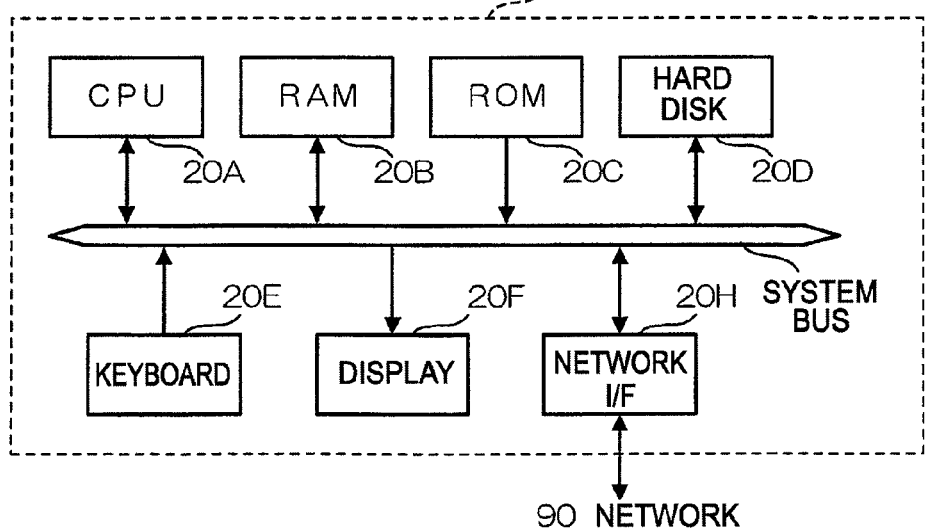
FIG. 19 is a block diagram showing a component configuration of an electrical system of an image processing device according to a second exemplary embodiment.

As shown in FIG. 19, the image processing device 20' according to the present exemplary embodiment differs only in that it is provided with a network interface (I/F) 20H for connecting to the network 95, in place of the input-output interface 20G provided in the image processing device 20.

Consequently, the image processing device 20' according to the present exemplary embodiment sends and receives various data to and from the image reading devices 30 via the network I/F 20H.

Note that further explanation is omitted since the functional configuration of the image processing device 20' according to the present exemplary embodiment is similar to that of the image processing device 20 according to the first exemplary embodiment, except in that the scanned image data, the before-correction image data, and the after-correction image data are not directly input from the image scanning device 30, but are input via the network 95 instead.

However, in the image processing system 10' according to the present exemplary embodiment, the scanned image data obtained by scanning the calibration sheet 23 with each of the image scanning device 30, is transmitted to the image processing device 20', together with address data previously assigned to each of the image reading devices 30. In dilation amount calculation according to the present exemplary embodiment, as shown in an example in FIG. 20, derived dilation amount data is associated with the address data of the image scanning device 30 originating transmission of the scanned image data, and stored on the hard disk 20D as individual dilation amount data 50D.

Explanation will now be given of the operation of the image processing system 10' when calculating the dilation amount, with reference to FIG. 21. FIG. 21 is a flow chart showing the process flow of an dilation amount calculation program executed on such an occasion by the CPU 20A of the image processing device 20'. In order to avoid confusion, explanation will be given here of a case where the above described reference image data is input from a non-illustrated external device and stored in advance in a predetermined region of the hard disk 20D. Steps in FIG. 21 for executing processing similar to those of FIG. 13 are allocated the same reference numerals, and explanation thereof is abbreviated.

In step 103 of FIG. 21, a standby state is maintained until image data scanned from one or other of the image reading devices 30 is received, and then, through step 106', identified position data is derived, based on the received scanned image data, by processing similar to the processing by the reference position identification section 26B described above.

Then, in step 122, determination is made as to whether or not dilation amount data relating to the image scanning device 30 originating transmission of the received scanned image data is stored (registered) in the individual dilation amount data 50D, by determining whether or not the address data received together with the scanned image data from the processing of above step 103 is stored in the individual dilation amount data 50D. When determination is negative the routine proceeds to step 124. Then, the dilation amount data expressing the dilation amount determined by the processing of step 118 is associated with the address data received together with the scanned image data, and stored (registered) in the individual dilation amount data 50D, before the routine proceeds to step 132, described later.

However, when determination at above step 122 is affirmative, the routine proceeds to step 126, the dilation amount data associated with the address data received together with the scanned image data is read out from the individual dilation amount data 50D. Then, through the next step 128, based on the read out dilation amount data (referred to below as "registered dilation amount data") and dilation amount data expressing the dilation amount determined by the processing of step 118 (referred to below as "new dilation amount data"), determination is made as to whether or not to refresh the registered dilation amount data with the new dilation amount data. When this determination is affirmative, the routine proceeds to step 130, and, after refreshing the registered dilation amount data with the new dilation amount data, the routine proceeds to step 132. However, when this determination is negative, the routine proceeds to step 132 without executing the processing of step 130. Note that in the image processing system 10' according to the present exemplary embodiment, determination to refresh when the dilation amount expressed by the new dilation amount data is greater than the dilation amount expressed by the registered dilation amount data, is applied for the determination of above step 123.

At step 132, determination is made as to whether or not a predetermined timing, a timing for ending the current dilation amount calculation program, has arrived. When this determination is negative the routine returns to above step 103, and when positive, the current dilation amount calculation program is ended at that point in time. Note that in the image processing system 10' according to the present exemplary embodiment, the time when instruction data is received by a receiving unit, such as the keyboard 20E input by a user, instructing the dilation amount calculation program to be ended, is applied as the predetermined timing applied in the processing of above step 132.

Note that the operation of the image processing system 10' according to the present exemplary embodiment when executing image processing to detect correction images is similar to that of the image processing system 10 according to the first exemplary embodiment, except in that the processing subjects, of the before-correction image data and the after-correction image data, are input to the image processing device 20' from the image scanning device 30 via the network 95. Therefore further explanation is omitted.

Explanation has been given by way of the above exemplary embodiments, however the technical scope of the present invention is not limited to the scope of the exemplary embodiment described above. Various modifications and improvements can be made to the above exemplary embodiments within a scope that does not depart from the spirit of the invention, and such modifications and improvements are included within the technical scope of the present invention.

Furthermore, the above exemplary embodiments are not limitations to the invention, and not all combinations of the features explained in the exemplary embodiments above are necessarily required to solve the problem of the invention. Various steps of invention are included in the exemplary embodiments explained above, and various inventions can be derived by combining plural configuration features disclosed. Even if given configuration feature(s) are removed from the total configuration features shown in the above exemplary embodiments, as long as an effect can be achieved, a configuration with these given configuration feature(s) removed can be derived as the invention.

For example, in each of the above exemplary embodiments, explanation has been given of cases where the dilation amount calculation and the image processing were realized by a software configuration. However, the present invention is no limited thereto, and, for example, an embodiment may be configured in which the dilation amount calculation and the image processing are realized by a hardware configuration. As an exemplary embodiment of such a case, for example, functional devices that execute similar processing to that of the configuring components of the image processing device 20 shown in FIG. 3 (the alignment section 22, the correction detector 24, the noise remover 25, the dilation amount calculator 26, and the correction region selector 29) may be configured. In such cases, an increase in the speed of image processing is expected, in comparison to the above exemplary embodiments.

Furthermore, explanation has been given in each of the above exemplary embodiments of cases where the calibration sheet serving as a reference medium is that shown in FIG. 11. However, the present invention is not limited thereto, and, for example, embodiments may use a reference medium such as those shown in FIG. 22A, FIG. 22B, FIG. 23A, FIG. 23B, FIG. 23C, or the like.

Figure 22A:
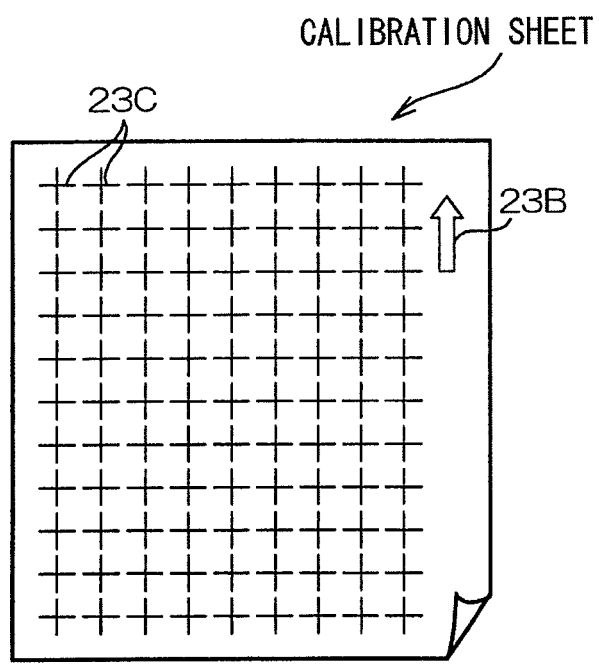
FIG. 22A is a front face diagram showing a configuration of another calibration sheet.
Figure 22B:
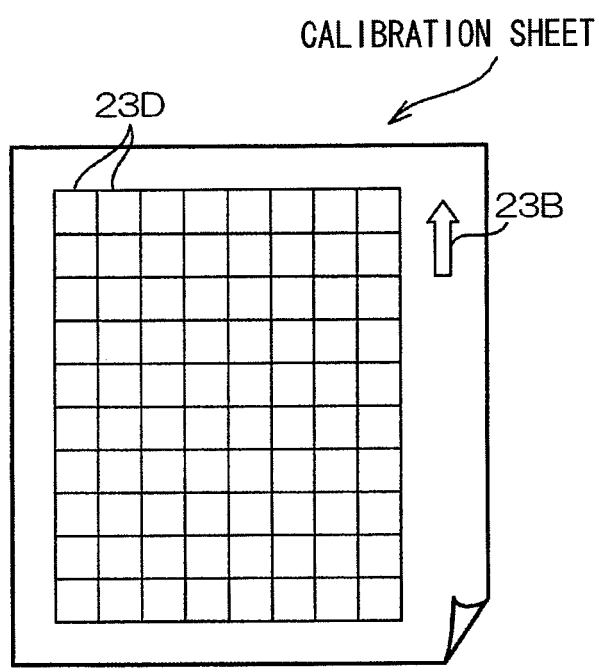
FIG. 22B is a front face diagram showing a configuration of another calibration sheet.

Note that calibration sheet shown in FIG. 22A is one in which cross-intersections 23C are applied as the reference images in place of the point images 23A, the calibration sheet shown in FIG. 22B is one in which a lattice image 23D is applied as the reference image in place of the point images 23A. When a calibration sheet drawn with the cross-intersections 23C shown in FIG. 22A is employed, in a similar manner to each of the above exemplary embodiments, a rectangle circumscribing each of the cross-intersections 23C is extracted, and the position of the cross-intersections 23C is identified by deriving the central position of the circumscribing rectangles. When a calibration sheet drawn with the lattice image 23D shown in FIG. 22B is used, the position of each of the cross intersections in the lattice image 23D is detected by known contour tracing processing, and the position of the cross-intersections are employed as the positions subjected to detecting the misalignment amount.

Figure 23A:
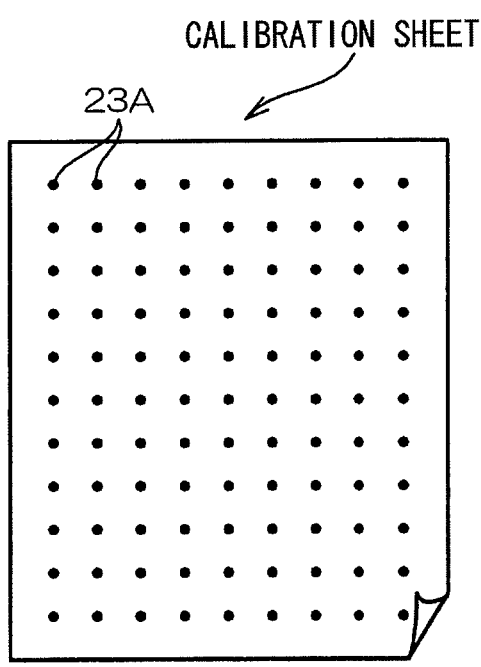
FIG. 23A is a front face diagram showing a configuration of another calibration sheet.
Figure 23B:
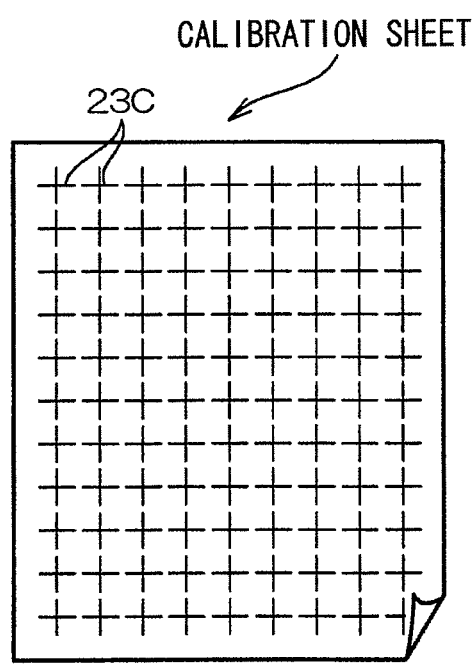
FIG. 23B is a front face diagram showing a configuration of another calibration sheet.
Figure 23C:
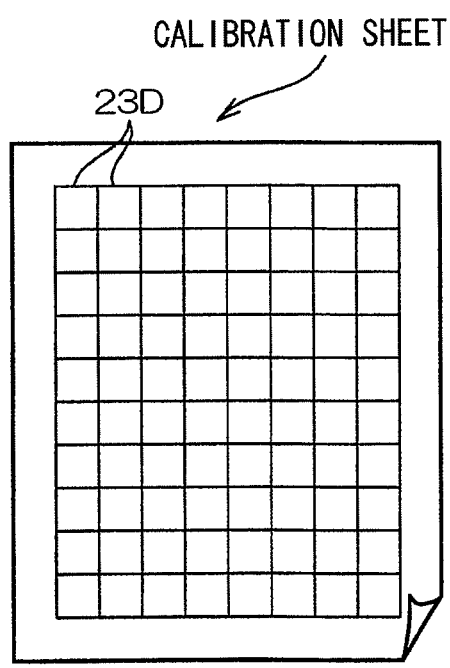
FIG. 23C is a front face diagram showing a configuration of another calibration sheet.

However, FIG. 23A, FIG. 23B, and FIG. 23C are the respective calibration sheets shown in FIG. 11, FIG. 22A, and FIG. 22B, from which the arrow 23B has been removed, and the position of each of the reference images (the point images 23A, the cross-intersections 23C, and the lattice image 23D) are positioned symmetrically about a point. For these calibration sheets the scanning direction with the image scanning device 30 does not matter.

Furthermore, while explanation has been given in the above exemplary embodiments of cases where image transformation processing is performed to the scanned image data by the image transformer 26E, the present invention is not limited thereto, and an embodiment may be configured where image transformation processing is executed on the reference image data.

Furthermore, while explanation has been given in the above exemplary embodiments of cases where the average value of the misalignment amount of the position of corresponding point images 23A for all of the point images 23A was employed, the present invention is not limited thereto. For example, an embodiment may be configured in which the value of the sum, the maximum value, or the like of the misalignment amount of the position of corresponding point images 23A for all of the point images 23A is employed.

Furthermore, while explanation has been given in the above exemplary embodiments of cases where the acquired position data is acquired from the reference image data, the present invention is not limited thereto. For example, an embodiment may be configured in which the above acquired position data is acquired from image data obtained by scanning the calibration sheet 23 using a high precision image reading device, in which the amount of distortion related to position of an image expressed by the image data obtained by scanning is a threshold value (for example, 100 μm) or less.

Furthermore, while explanation has been given in the above exemplary embodiments of cases where the acquired position data is acquired from the reference image data, the present invention is not limited thereto. An embodiment may be configured in which, as the above acquired position data, identified by processing similar to the processing by, as an example, the reference position identification section 26B, the position of the point images 23A (reference image) expressed by image data is obtained by scanning the calibration sheet 23 using the image scanning device 30 at a different timing to the timing of the scanned image data according to each of the above exemplary embodiments. In such cases, the dilation amount is determined taking into consideration changes in localized distortions of the image due to the image scanning device 30 arising from changes in the environmental conditions, or caused by the passage of time, or the like.

Furthermore, in the above second exemplary embodiment, explanation was given of a case where, in the dilation amount calculation program, the maximum value of the dilation amount expressed by the dilation amount data derived until then was stored, however the present invention is not limited thereto. For example, an embodiment may be configured in which the dilation amount data of the highest frequency in the dilation amount data derived until then is stored, or the dilation amount data indicating the average value of the dilation amounts expressed by the dilation amount data derived until then is stored.

Furthermore, in the above second exemplary embodiment, explanation was given of a case where the timing when instruction data is received by a receiving unit, such as the keyboard 20E input by a user, instructing the dilation amount calculation program to be ended, was applied as the timing to end the dilation amount calculation program. However the present invention is not limited thereto, and, for example, an embodiment may be configured in which the timing applied is when a predetermined end-time of a time band for executing the dilation amount calculation program, is arrived at, or in which the timing applied is when data is received indicating the end of scanning processing from all of the subject image reading devices 30.

Furthermore, in the above second exemplary embodiment, explanation was given of a case where the dilation amount calculation program and the image processing program were executed separately. However, the present invention is not limited thereto. For example, an embodiment may be configured in which determination is made as to whether or not image data received via the network 90 is scanned image data, before-correction image data, or after-correction image data, and the dilation amount calculation program or the image processing program automatically and selectively executed according to the determination result.

Furthermore, explanation has been given in each of the above exemplary embodiments of cases in the repeated processing from step 306 to step 318 of the correction image detection routine/program, where processing of mutually overlapping correction regions in the correction region a and the correction region b was performed one pair at a time. However, the present invention is not limited thereto, and, for example, when plural correction regions contained in the correction region a overlap with one or other of plural correction regions in the correction region b, or when plural correction regions contained in the correction region b overlap with one or other of plural correction regions in the correction region a, an embodiment may be configured in which the plural correction regions are aggregated and treated as a single correction region on which the processing from the above step 306 to step 318 is executed. In such cases, an increase in image processing speed is expected in comparison to the above exemplary embodiments.

In addition, configurations of the image processing system 10, 10', and the image processing device 20, 20', explained in each of the above exemplary embodiments (see FIG. 1 to FIG. 5, FIG. 10, FIG. 18 and FIG. 19) are only examples thereof, and portions that are not required thereof may be removed, and new portions may be added, within a scope that does not depart from the spirit of the invention.

Furthermore, the data structure of each of the various types of data explained in each of the above exemplary embodiments (see FIG. 8A, FIG. 8B, FIG. 9, FIG. 12A, FIG. 12B, FIG. 12C, and FIG. 20) are also only examples thereof, and modifications and additions may be made thereto within a scope that does not depart from the spirit of the invention.

Furthermore, the process flow of the dilation amount calculation program, the image processing program, and the correction image detection routine/program described in each of the above exemplary embodiments (see FIG. 13 to FIG. 15 and FIG. 21) are also only examples thereof, and steps not required may be removed, new steps may be added, and the processing sequence may be changed, within a scope that does not depart from the spirit of the invention.

What is claimed is:

1. An image processing device comprising:
an acquiring unit that acquires position data expressing positions of a plurality of reference images provided on a reference medium;
a scanning unit that scans images of regions of the reference medium where the reference images are provided; and
a determination unit that:
calculates a sum of positional misalignment amounts between an image position of an instance of the plurality of reference images scanned by the scanning unit, and a position of the same instance of the plurality of reference images indicated by the position data acquired by the acquiring unit;
performs alignment of the corresponding reference images using a common correction coefficient predetermined so as to give the smallest sum of the positional misalignment amounts; and
determines a dilation amount in advance for dilating an image data to be scanned by the scanning unit, such that the dilation amount increases as the sum of the positional misalignment amounts increases,
wherein the determination unit determines dilation amounts for each scanning by employing image data scanned a plurality of times from a region of the reference medium where the reference image is provided, and determines a final dilation amount based on the plurality of determined dilation amounts.

2. An image processing device comprising:
an acquiring unit that acquires position data expressing positions of a plurality of reference images provided on a reference medium;
a scanning unit that scans images of regions of the reference medium where the reference images are provided; and
a determination unit that:
calculates a sum of positional misalignment amounts between an image position of an instance of the plurality of reference images scanned by the scanning unit, and a position of the same instance of the plurality of reference images indicated by the position data acquired by the acquiring unit;
performs alignment of the corresponding reference images using a common correction coefficient predetermined so as to give the smallest sum of the positional misalignment amounts; and
determines a dilation amount for dilating an image data scanned by the scanning unit, such that the dilation amount increases as the sum of the positional misalignment amounts increases, further comprising:
a first execution unit that performs alignment using the common correction coefficient on at least one of first image data expressing an image of a first document that is a document scanned with the scanning unit before performing correction and second image data expressing an image of a second document that is a document scanned after performing correction;
a second execution unit that executes the image dilation on at least one of the first image data and the second image data with the dilation amount determined by the determination unit; and
an extraction unit that, after both the alignment has been performed by the first execution unit and the image dilation has been executed by the second execution unit, extracts a correction image expressing the correction based on a computation result of difference between the first image data and the second image data.

3. An image processing system comprising an image processing device, the image processing device comprising:
an image scanning device comprising a scanning unit that scans an image of a region where a plurality of reference images are provided on a reference medium, and a transmission unit that transmits image data that has been scanned by the scanning unit; and
an image processing device comprising a receiving unit that receives the image data transmitted by the transmission unit, an acquiring unit that acquires the position data expressing the position of the plurality of reference images on the reference medium, and a determination device that:
calculates a sum of positional misalignment amounts between an image position of an instance of the plurality of reference images received by the receiving unit, and a position of the same instance of the plurality of reference images indicated by the position data acquired by the acquiring unit;
performs alignment of the corresponding reference images using a common correction coefficient predetermined so as to give the smallest sum of the positional misalignment amounts; and
determines a dilation amount for image dilation on image data scanned by the scanning unit, such that the dilation amount increases as the sum of the positional misalignment amounts increases, wherein the image processing system comprises a plurality of the image processing devices, and the image processing system further comprises a storage unit that, for each of the respective plurality of image reading devices, associates image data expressing the dilation amount with identification data for identifying the corresponding image reading device, and stores the associated data.

4. A non-transitory computer readable storage medium including processor-readable instructions that are executable by a processor to perform image processing, the image processing comprising:
  acquiring position data expressing positions of a plurality of reference images provided on a reference medium;
  scanning an image of a region of the reference medium provided with the reference images;
  calculating a sum of positional misalignment amounts between an image position of an instance of the plurality of scanned reference images, and a position of the same instance of the plurality of reference images indicated by the acquired position data;
  performing alignment of the corresponding reference images using a common correction coefficient predetermined so as to give the smallest sum of the positional misalignment amounts; and
  determining a dilation amount in advance for image dilation of image data to be scanned, such that the dilation amount increases as the sum of the positional misalignment amounts increases,
  wherein determining the dilation amount comprises:
  determining dilation amounts for each time of scanning, by employing image data scanned a plurality of times from an image in a region of the reference medium where the reference image is provided; and
  determining a final dilation amount based on the plurality of determined dilation amounts.

5. A non-transitory computer readable storage medium including processor-readable instructions that are executable by a processor to perform image processing, the image processing comprising:
  acquiring position data expressing positions of a plurality of reference images provided on a reference medium;
  scanning an image of a region of the reference medium provided with the reference images;
  calculating a sum of positional misalignment amounts between an image position of an instance of the plurality of scanned reference images, and a position of the same instance of the plurality of reference images indicated by the acquired position data;
  performing alignment of the corresponding reference images using a common correction coefficient predetermined so as to give the smallest sum of the positional misalignment amounts; and
  determining a dilation amount for image dilation on the scanned image data, such that the dilation amount increases as the sum of the positional misalignment amounts increases, wherein the image processing further comprises:
  performing alignment using the correction coefficient on at least one of first image data scanned from an image of a first document that is a document before performing correction and second image data scanned from an image of a second document that is the document after performing correction;
  executing the image dilation on at least one of the first image data and the second image data with the determined dilation amount; and,
  after both the alignment has been performed and the image dilation has been executed, extracting a correction image expressing the correction based on a computation result of a difference between the first image data and the second image data.

6. An image processing method comprising:
  acquiring position data expressing positions of a plurality of reference images provided on a reference medium;
  scanning an image of a region of the reference medium where the reference image is provided;
  calculating a sum of positional misalignment amounts between an image position of an instance of the plurality of scanned reference images, and a position of the same instance of the plurality of reference images indicated by the acquired position data;
  performing alignment of the corresponding reference images using a common correction coefficient predetermined so as to give the smallest sum of the positional misalignment amounts; and
  determining a dilation amount in advance for image dilation of image data to be scanned, such that the dilation amount increases as the sum of the positional misalignment amounts increases,
  wherein determining the dilation amount comprises:
  determining dilation amounts for each time of scanning, by employing image data scanned a plurality of times from an image in a region of the reference medium where the reference image is provided; and
  determining a final dilation amount based on the plurality of determined dilation amounts.

7. An image processing method comprising:
  acquiring position data expressing positions of a plurality of reference images provided on a reference medium;
  scanning an image of a region of the reference medium where the reference image is provided;
  calculating a sum of positional misalignment amounts between an image position of an instance of the plurality of scanned reference images, and a position of the same instance of the plurality of reference images indicated by the acquired position data;
  performing alignment of the corresponding reference images using a common correction coefficient predetermined so as to give the smallest sum of the positional misalignment amounts; and
  determining a dilation amount for image dilation on the scanned image data, such that the dilation amount increases as the sum of the positional misalignment amounts increases, wherein the image processing further comprises:
  performing alignment using the correction coefficient on at least one of first image data scanned from an image of a first document that is a document before performing correction and second image data scanned from an image of a second document that is the document after performing correction;
  executing the image dilation on at least one of the first image data and the second image data with the determined dilation amount; and
  after both the alignment has been performed and the image dilation has been executed,
  extracting a correction image expressing the correction based on a computation result of difference between the first image data and the second image data.

* * * * *